(12) United States Patent
Kasahara et al.

(10) Patent No.: US 11,366,334 B2
(45) Date of Patent: Jun. 21, 2022

(54) OPTICAL UNIT WITH SHAKE CORRECTION FUNCTION

(71) Applicant: NIDEC SANKYO CORPORATION, Nagano (JP)

(72) Inventors: Shogo Kasahara, Nagano (JP); Shinji Hatano, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 17/190,418

(22) Filed: Mar. 3, 2021

(65) Prior Publication Data
US 2021/0278689 A1   Sep. 9, 2021

(30) Foreign Application Priority Data

Mar. 4, 2020   (JP) .............................. JP2020-036402

(51) Int. Cl.
| | |
|---|---|
| G02B 27/64 | (2006.01) |
| G02B 7/02 | (2021.01) |
| H02K 41/035 | (2006.01) |
| H04N 5/232 | (2006.01) |
| G03B 5/02 | (2021.01) |

(52) U.S. Cl.
CPC ........... *G02B 27/646* (2013.01); *G02B 7/021* (2013.01); *G03B 5/02* (2013.01); *H02K 41/0356* (2013.01); *H04N 5/23287* (2013.01); *G03B 2205/0069* (2013.01)

(58) Field of Classification Search
USPC ......... 396/52–55; 348/208.1–208.13, 208.99
See application file for complete search history.

(56) References Cited

U.S. PATENT DOCUMENTS

| | | | |
|---|---|---|---|
| 8,682,151 B2 | 3/2014 | Minamisawa et al. | |
| 9,151,964 B2 | 10/2015 | Takei et al. | |
| 9,568,743 B2 | 2/2017 | Hayashi | |
| 9,891,444 B2 * | 2/2018 | Minamisawa | ..... H04N 5/23287 |
| 9,933,629 B2 | 4/2018 | Minamisawa | |
| 10,845,611 B2 | 11/2020 | Minamisawa | |

(Continued)

FOREIGN PATENT DOCUMENTS

| | | |
|---|---|---|
| CN | 102576180 | 7/2012 |
| CN | 103238110 | 8/2013 |

(Continued)

*Primary Examiner* — Clayton E. LaBalle
*Assistant Examiner* — Warren K Fenwick
(74) *Attorney, Agent, or Firm* — JCIPRNET

(57) ABSTRACT

An optical unit with a shake correction function rotates a movable body around X, Y, and Z axes to perform a shake correction. The optical unit with a shake correction function includes a flexible printed board pulled out from the movable body in a +X direction and a board support part to support the flexible printed board at a position away from the movable body in an X-axis direction. The flexible printed board includes a first extending part pulled out from the movable body in the +X direction along an XY plane, a meandering part extending in a Y-axis direction while meandering in the X-axis direction after being curved in a Z-axis direction from an end of the first extending part in the Y-axis direction, and a second extending part extending in the +X direction along the XY plane in the +X direction of the meandering part.

11 Claims, 15 Drawing Sheets

(56) References Cited

U.S. PATENT DOCUMENTS

| | | | |
|---|---|---|---|
| 10,976,640 B2 | 4/2021 | Minamisawa et al. | |
| 2015/0331250 A1 | 11/2015 | Terajima | |
| 2018/0284477 A1* | 10/2018 | Minamisawa | ......... G03B 17/02 |

FOREIGN PATENT DOCUMENTS

| | | |
|---|---|---|
| CN | 104765222 | 7/2015 |
| CN | 105247413 | 1/2016 |
| CN | 105452953 | 3/2016 |
| CN | 108693655 | 10/2018 |
| CN | 108693680 | 10/2018 |
| JP | 2018169499 | 11/2018 |

* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2020-036402, filed on Mar. 4, 2020, and the entire content of which is incorporated herein by reference.

BACKGROUND

Field of the Invention

At least an embodiment of the present invention relates to an optical unit with a shake correction function for performing a shake correction by rotating a camera module around three axes orthogonal to one another.

Description of the Related Documents

There is an optical unit for rotating a movable body mounted with a camera module around an optical axis, a first optical axis orthogonal to the optical axis, and a second optical axis orthogonal to the optical axis and the first axis to suppress a disturbance of a captured image when a mobile terminal or a moving body moves, in optical units mounted on the mobile terminal or the moving body. Japanese Unexamined Patent Application Publication No. 2018-169499 (hereinafter, referred to as Patent Document 1) describes this type of optical unit with a shake correction function.

The optical unit with a shake correction function in Patent Document 1 includes a movable body provided with a camera module, a fixed body, and a swing support mechanism to rotatably support the movable body around a rotation axis intersecting an optical axis relative to the fixed body. A flexible printed board connected to the camera module is pulled out from the movable body. The flexible printed board is pulled out into a U-lettered bending shape once on a rear side in an optical axis direction of the movable body, and then is pulled out radially outward of the fixed body surrounding the movable body.

The movable body rotates while bending the flexible printed board. Therefore, a movement of the movable body may be hindered by a springiness of the flexible printed board.

If a moving range of the flexible printed board generated when the movable body rotates is large, an outer shape of the optical unit with a shake correction function increases in size. For example, if the flexible printed board moves significantly in the optical axis direction when the movable body rotates around an axis intersecting the optical axis, a height of the optical unit with a shake correction function in the optical axis direction increases, and this is disadvantageous for reducing in size.

In view of these problems, at least an embodiment of the present invention provides an optical unit with a shake correction function with which it is possible to prevent a rotation of a movable body to rotate around three axes orthogonal to one another from being hindered by a flexible printed board and possible to reduce a moving range of the flexible printed board when the movable body rotates.

SUMMARY

An optical unit with a shake correction function according to at least an embodiment of the present invention includes: a movable body having a camera module, when three axes orthogonal to one another are an X axis, a Y axis, and a Z axis, the movable body configured to be rotatably supported around the X axis, the Y axis, and the Z axis; a flexible printed board, configured to be pulled out from the movable body; and a board support part, configured to support the flexible printed board at a position apart from the movable body in a direction of the X axis. When a direction from the camera module toward the board support part is a first direction in the direction of the X axis, the flexible printed board includes: a first extending part, configured to be pulled out from the movable body in the first direction along an XY plane comprising the X axis and the Y axis; a meandering part, configured to be curved in a direction of the Z axis from an end of the first extending part in a direction of the Y axis, and extend in the direction of the Y axis while meander in the direction of the X axis; and a second extending part, configured to be arranged in the first direction of the meandering part, extend in the first direction along the XY plane, and be fixed to the board support part.

In at least an embodiment of the present invention, the flexible printed board connected to the movable body includes the meandering part, the first extending part, and the second extending part, and the second extending part is fixed to the board support part. Therefore, when the movable body rotates around the X axis, the Y axis, and the Z axis, it is possible to prevent a rotation of the movable body from being hindered by the flexible printed board. That is, the meandering part, which extends in the direction of the Y axis while meandering in the direction of the X axis, is likely to bend when the movable body rotates around the X axis and the Z axis. Both the first extending part pulled out from the camera module and the second extending part fixed to the board support part, which extend along the XY plane, are likely to bend in the Z-axis direction when the movable body rotates around the Y axis. Therefore, it is possible to prevent a whole of the flexible printed board from moving significantly in the direction of the Z axis when the movable body rotates around the Y axis. Therefore, it is advantageous for a reduction in size of the optical unit with a shake correction function in the direction of the Z axis.

In at least an embodiment of the present invention, the flexible printed board may include: a third extending part, configured to be curved in the direction of the Y axis from an end of the meandering part in the first direction, and extend in the direction of the Y axis; and a fourth extending part, configured to be curved in the first direction from an end of the third extending part in the direction of the Y axis, and extend in the first direction. And, the second extending part may be configured to be curved in the direction of the Y axis from an end of the fourth extending part in the direction of the Z axis, and extend along the XY plane. Thus, it is possible to arrange both the first extending part and the second extending part along the XY plane. It is further possible to provide a large space for arranging the meandering part in a dead space between the first extending part and the second extending part. The meandering part easily bends when the movable body rotates around the Z axis.

In at least an embodiment of the present invention, it is preferable that the flexible printed board includes: a flat surface portion, and a curved portion curved from an end of the flat surface portion. And, the flat surface portion is arranged in each of the first extending part, the meandering part, the third extending part, the fourth extending part, and the second extending part. The curved portion includes: a first curved portion, configured to be curved in the direction of the Z axis from an end of the first extending part in the direction of the Y axis to be connected to the meandering part; second curved portions, configured to be provided at folded positions of the meandering part; a third curved portion, configured to be curved in the direction of the Y axis from an end in the first direction of the meandering part to be connected to the third extending part; a fourth curved portion, configured to be curved in the first direction from an end of the third extending part in the direction of the Y axis to be connected to the fourth extending part; and a fifth curved portion, configured to be curved in the direction of the Y axis from an end of the fourth extending part in the direction of the Z axis to be connected to the second extending part. Each of the first curved portion, the second curved portion, the third curved portion, the fourth curved portion, and the fifth curved portion is fixed with a curved-shape holding member. Thus, when the curved-shape holding member is used, a shape of the flexible printed board is easily maintained.

In at least an embodiment of the present invention, the curved-shape holding member is a rod-shaped member having a cylindrical outer peripheral surface. Thus, when the rod-shaped member is wound around the outer peripheral surface, it is possible to maintain a shape of the flexible printed board in a curved way.

In at least an embodiment of the present invention, the curved-shape holding member is a metal plate bent in a curved shape. If the metal plate is used, the metal plate in a flat plate shape is attached to a folding position of the flexible printed board, and when the flexible printed board is curved, it is possible to simultaneously deform the metal plate in a curved shape. Therefore, it is possible to easily attach the curved-shape holding member.

In at least an embodiment of the present invention, the curved-shape holding member is a cured product obtained by curing an adhesive. If the adhesive is used, it is possible to reduce the number of components.

In at least an embodiment of the present invention, the flexible printed board may include: a first board portion and a second board portion, configured to be arranged in the direction of the Y axis; and a third board portion, configured to connect an end portion of the first board portion in the first direction and an end portion of the second board in the first direction. The first board portion and the second board portion may have a shape symmetrical with respect to a virtual plane parallel to an XZ plane including the X axis and the Z axis between the first board portion and the second board portion, each of the first board portion and the second board portion may include the first extending part, the meandering part, the third extending part, and the fourth extending part, and the third board portion may include the second extending part. Thus, it is possible to distribute a wiring pattern connected to the movable body to each of the first board portion and the second board portion. As a result, it is possible to decrease a width dimension of the first board portion and the second board portion to easily bend the flexible printed board, and as a result, it is possible to prevent the flexible printed board from hindering the rotation of the movable body. The meandering part is routed in a meandering shape after being curved in the direction of the Z axis, and thus, the width dimensions of the first board portion and the second board portion are reduced in size to decrease a height of the meandering part in the Z-axis direction. Therefore, it is advantageous for a reduction in size of the optical unit with a shake correction function in the direction of the Z axis. The first board portion and the second board portion have a shape symmetrical with respect to the virtual plane parallel to the XZ plane, and thus, when the movable body rotates, it is possible to bend the first board portion and the second board portion in the same way. Therefore, the rotation of the movable body is stable. The first board portion and the second board portion are connected by the third board portion. As a result, there is only one flexible printed board fixed to the board support part and pulled out to the outside of the optical unit with a shake correction function, and thus, it is easy to perform a connection task of connecting the flexible printed board to an external wiring.

In at least an embodiment of the present invention, a planar shape obtained when the flexible printed board is developed may include: a pair of first linear board portions, configured to be extended in parallel in a straight line; a pair of one-side protruding board portions, configured to be protruded outward in a facing direction in which the pair of first linear board portions face each other, from one end portions of each of the first linear board portions in an extending direction; a pair of second linear board portions, configured to be extended in the extending direction from an outer end portion in the facing direction of each of the one-side protruding board portions; a pair of alternate-side protruding board portions, configured to be protruded inward in the facing direction from one end portion in the extending direction of each of the second linear board portions; and a connection board portion, configured to connect the pair of alternate-side protruding board portions on the other side in the extending direction of the pair of the second linear board portions. Thus, a developed shape of the flexible printed board is a simple shape. Therefore, it is easy to manufacture the flexible printed board. A yield obtained when the flexible printed board is manufactured is good, and thus, it is possible to reduce a manufacturing cost. When a three-dimensional flexible printed board is manufactured, after the pair of second linear board portions are folded to form the meandering part, the pair of one-side protruding board portions and the pair of alternate-side protruding board portions may be folded in the same direction to rotate the meandering part by 90 degrees. Therefore, it is easy to perform a task of processing the flexible printed board into an easy-to-bend three-dimensional shape.

In at least an embodiment of the present invention, as the flexible printed board, a first flexible printed board and a second flexible printed board arranged in the direction of the Y axis, may be provided, and the first flexible printed board and the second flexible printed board may have a shape symmetrical relative to a virtual plane parallel to an XZ plane comprising the X axis and the Z axis between the first flexible printed board and the second flexible printed board. Thus, it is possible to distribute a wiring pattern connected to the movable body to each of the first flexible printed board and the second flexible printed board. As a result, it is possible to suppress width dimensions of the first flexible printed board and the second flexible printed board, and thus, it is possible to easily suppress the flexible printed board from hindering the rotation of the movable body. The meandering part is routed to meander after being curved in the direction of the Z axis, and thus, the width dimensions of the first board portion and the second board portion are reduced in size to decrease a height of the meandering part in the Z-axis direction. Therefore, it is advantageous for a reduction in size of the optical unit with a shake correction function in the direction of the Z axis.

In at least an embodiment of the present invention, the Z axis may coincide with an optical axis of the camera module. Thus, when the movable body rotates around the optical axis, in a pitch direction orthogonal to the optical axis, and in a yaw direction orthogonal to the optical axis and the pitch direction, it is possible to prevent the flexible printed board from hindering a movement of the movable body.

In at least an embodiment of the present invention, a shake correction magnetic drive mechanism to rotate the movable body around the X axis and the Y axis, and a rolling correction magnetic drive mechanism to rotate the movable body around the Z axis may be provided. In at least an embodiment of the present invention, when the movable body rotates around the X axis, the Y axis, and the Z axis, the flexible printed board is likely to bend. Therefore, when the movable body is rotated, a load caused by the bending of the flexible printed board is small. Therefore, as a result of the reduced load caused by the bending of the flexible printed board, it is possible to reduce a driving force of the shake correction magnetic drive mechanism to rotate the movable body around the X axis and the Y axis. As a result of the reduced load caused by the bending of the flexible printed board, it is possible to reduce a driving force of the rolling correction magnetic drive mechanism to rotate the movable body around the Z axis. Therefore, it is possible to maintain a low power consumption of the shake correction magnetic drive mechanism and the rolling correction magnetic drive mechanism.

According to at least an embodiment of the present invention, the flexible printed board connected to the movable body includes the meandering part, the first extending part, and the second extending part, and the second extending part is fixed to the board support part, and thus, when the movable body rotates around the X axis, Y axis, and Z axis, it is possible to prevent the rotation of the movable body from being hindered by the flexible printed board. That is, the meandering part, which extends in the direction of the Y axis while meandering in the direction of the X axis, is likely to bend when the movable body rotates around the X axis and the Z axis. Both the first extending part pulled out from the camera module and the second extending part fixed to the board support part, which extend along the XY plane, are likely to bend when the movable body rotates around the Y axis. Therefore, it is possible to prevent a whole of the flexible printed board from moving significantly in the direction of the Z axis when the movable body rotates around the Y axis. Therefore, it is advantageous for a reduction in size of the optical unit with a shake correction function in the direction of the Z axis.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

With reference to the drawings, embodiments of an optical unit with a shake correction function to which at least an embodiment of the present invention is applied will be described below.

Overall Configuration

Figure 1:
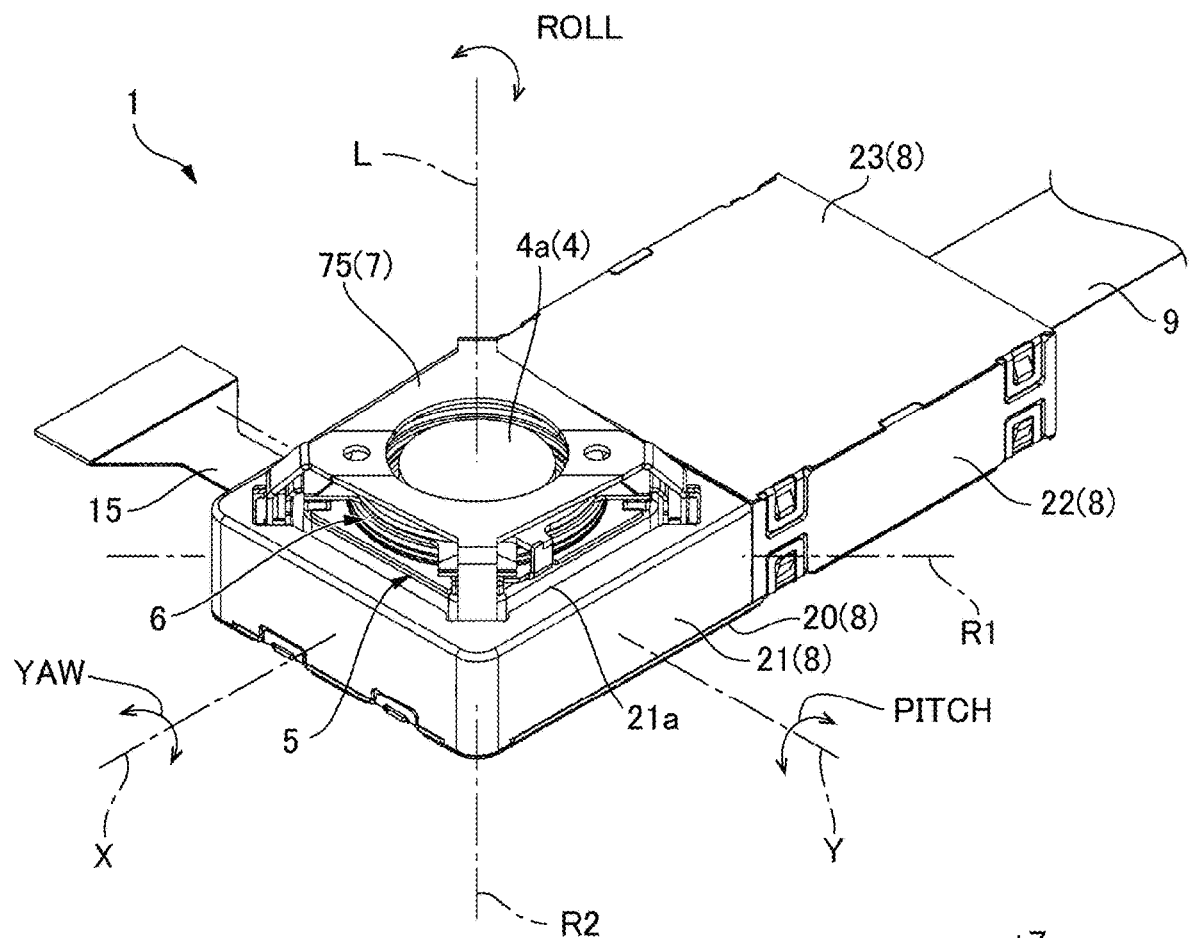
FIG. 1 is a perspective view of an optical unit with a shake correction function to which at least an embodiment of the present invention is applied.
Figure 1:
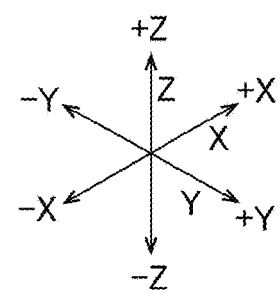
Figure 2:
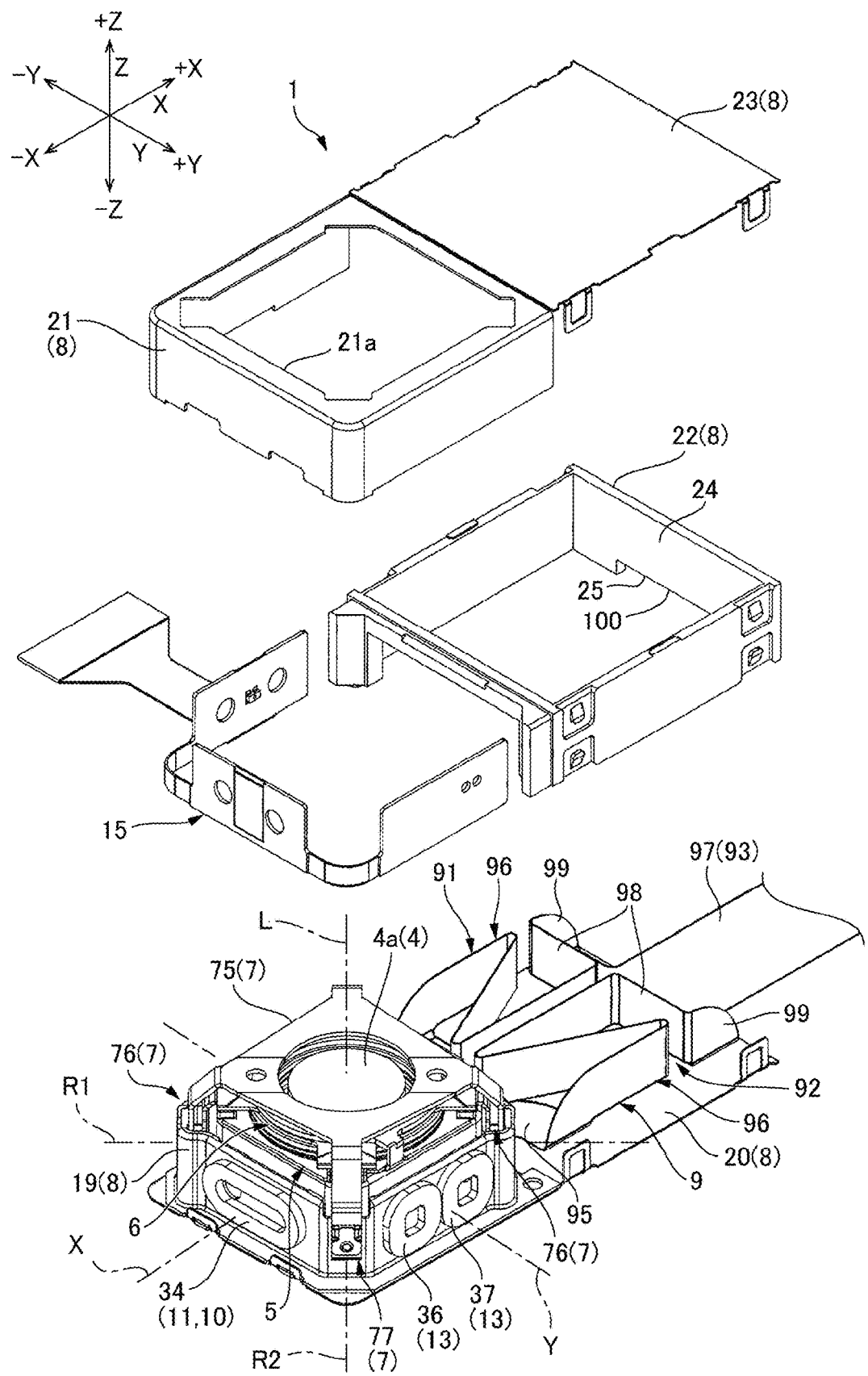
FIG. 2 is an exploded perspective view of the optical unit with a shake correction function in FIG. 1.
Figure 3:
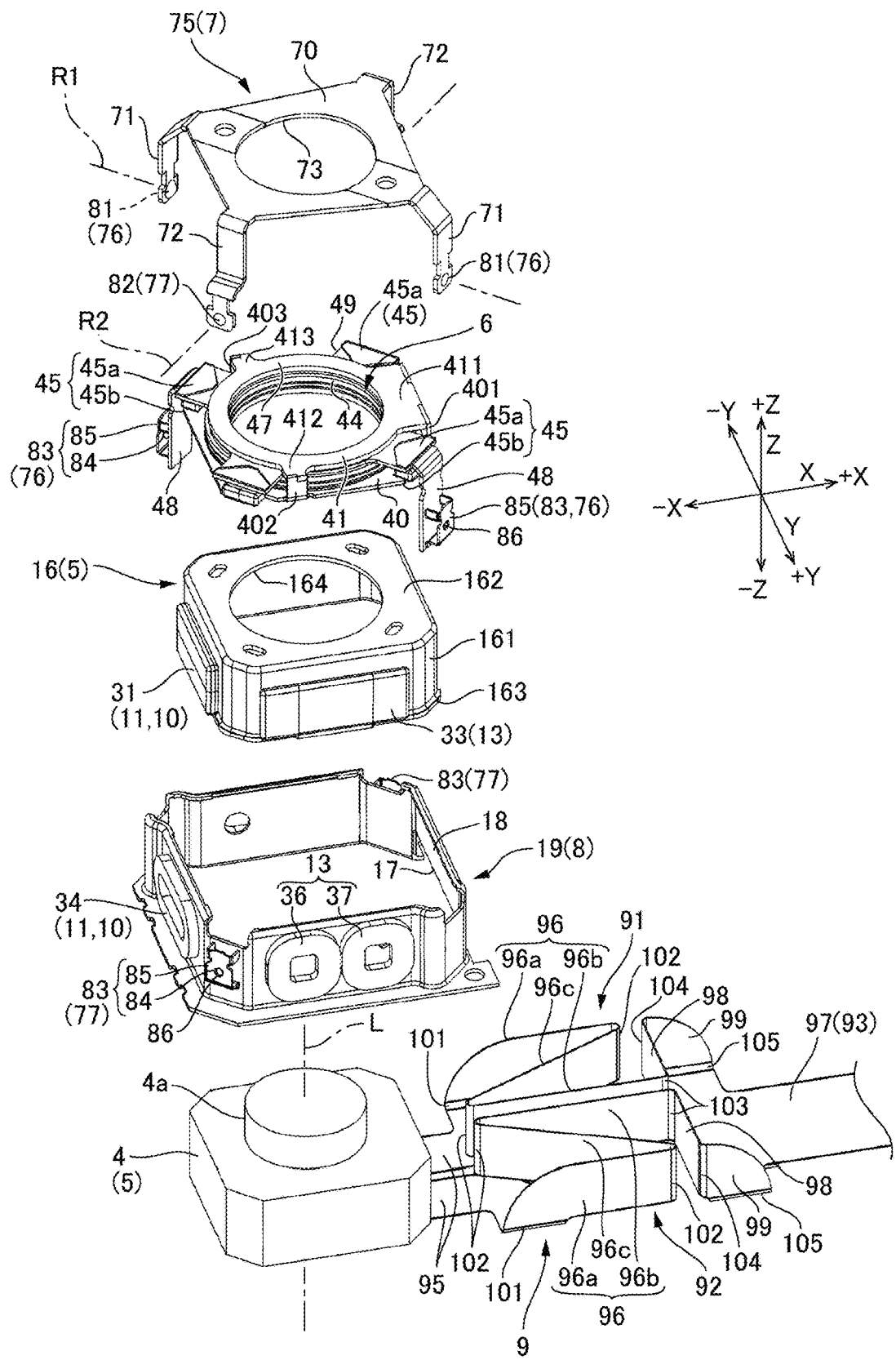
FIG. 3 is an exploded perspective view of the optical unit with a shake correction function from which a part of a fixed body is removed.
Figure 4:
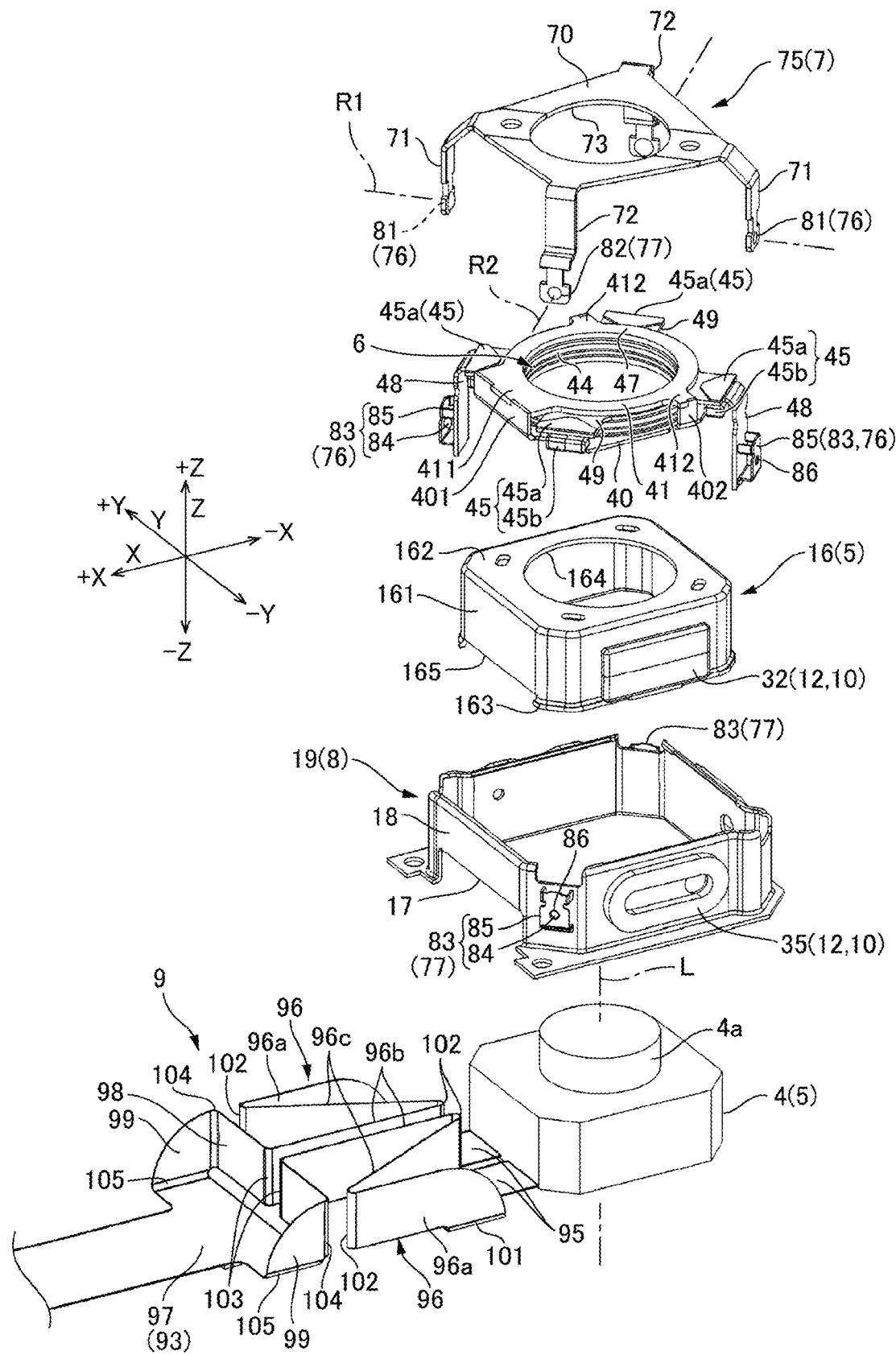
FIG. 4 is an exploded perspective view of the optical unit with a shake correction function from which the part of the fixed body is removed, as viewed from a direction different from that in FIG. 3.
Figure 5:
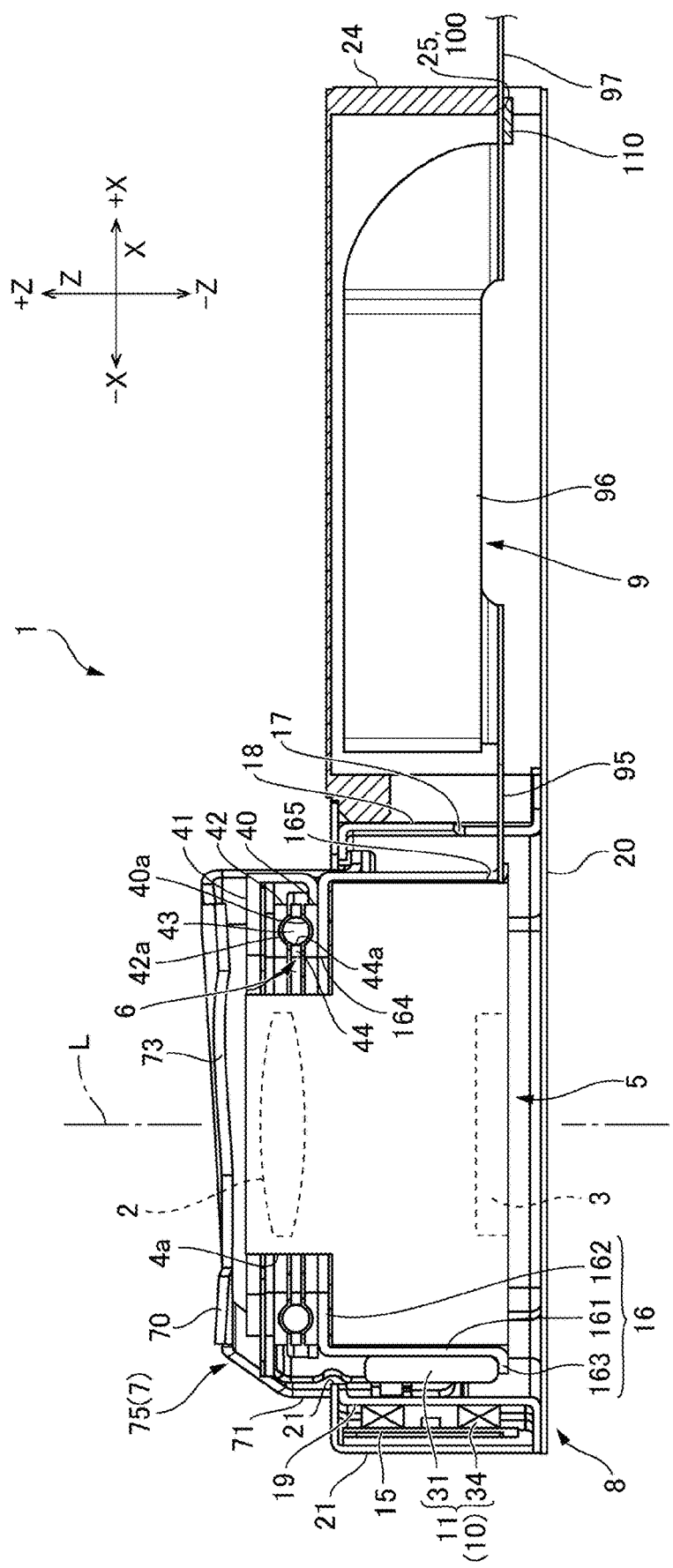
FIG. 5 is a cross-sectional view of the optical unit with a shake correction function obtained when cut along an XZ plane.

FIG. 1 is a perspective view of an optical unit with a shake correction function to which at least an embodiment of the present invention is applied. FIG. 2 is an exploded perspective view of the optical unit with a shake correction function in FIG. 1. FIG. 3 is an exploded perspective view of the optical unit with a shake correction function from which a part of a fixed body is removed. FIG. 4 is an exploded perspective view of the optical unit with a shake correction function from which the part of the fixed body is removed, as viewed from a direction different from that in FIG. 3. FIG. 5 is a cross-sectional view of the optical unit with a shake correction function obtained when cut along an XZ plane.

An optical unit with a shake correction function 1 includes a camera module 4 including a lens 2 and an image pickup element 3 (see FIG. 5). The optical unit with a shake correction function 1 is used, for example, in an optical device such as a mobile telephone with a camera and a drive recorder, and an optical device such as an action camera and a wearable camera mounted on a moving body such as a helmet, a bicycle, and a radio-controlled helicopter. In such an optical device, if the optical device is shaken during capturing an image, a captured image is distorted. The optical unit with a shake correction function 1 corrects an inclination of the movable body, based on an acceleration, an angular velocity, and a shake amount detected by a detection means such as a gyroscope, to avoid the captured image from being inclined.

The optical unit with a shake correction function 1 rotates the camera module 4 around an optical axis L, around a first axis R1 orthogonal to the optical axis L, and around a second axis R2 orthogonal to the optical axis L and the first axis R1 to perform a shake correction. Therefore, the optical unit with a shake correction function 1 performs a rolling correction, a pitching correction, and a yawing correction.

In the following description, three axes orthogonal to one another are an X axis, a Y axis, and a Z axis. The Z axis coincides with the optical axis L. The X axis is orthogonal to the optical axis L and passes through an intersection of the first axis R1 and the second axis R2. The X axis intersects the first axis R1 and the second axis R2 at an angle of 45°. The Y axis is orthogonal to the optical axis L and X axis and passes through an intersection of the first axis R1 and the second axis R2. The Y axis intersects the first axis R1 and the second axis R2 at an angle of 45°. Therefore, if a plane including the X axis and the Y axis is an XY plane, the first axis R1 and the second axis R2 are located on the XY plane. The first axis R1 and the second axis R2 are inclined by 45° with respect to the X axis and the Y axis around the Z axis.

In the following description, directions along the X axis, Y axis, and Z axis are defined as an X-axis direction, a Y-axis direction, and a Z-axis direction. One side in the X-axis direction is a −X direction, and the other side therein is a +X direction. One side in the Y-axis direction is a −Y direction, the other side therein is a +Y direction, one side in the Z-axis direction is a −Z direction, and the other side therein is a +Z direction. The Z-axis direction is an optical axis direction along the optical axis L of the lens 2 included in the camera module 4. The −Z direction is close to an image of the camera module 4, and the +Z direction is close to a subject of the camera module 4. A direction along the first axis R1 is defined as a first axis R1 direction, and a direction along the second axis R2 is defined as a second axis R2 direction.

As illustrated in FIGS. 1 and 2, the optical unit with a shake correction function 1 includes a movable body 5 including the camera module 4 and a rotation support mechanism 6 to rotatably support the movable body 5 around the optical axis L. Therefore, the movable body 5 is capable of rotating in a roll direction ROLL around the optical axis L. The optical unit with a shake correction function 1 includes a gimbal mechanism 7 to rotatably support the rotation support mechanism 6 around the first axis R1 and to rotatably support the rotation support mechanism 6 around the second axis R2, and a fixed body 8 to support the movable body 5 via the gimbal mechanism 7 and the rotation support mechanism 6.

Therefore, the movable body 5 is swingably supported around the first axis R1 and swingably supported around the second axis R2 via the gimbal mechanism 7. Here, in combining the rotation around the first axis R1 and the rotation around the second axis R2, the movable body 5 is capable of rotation in a yaw direction YAW around the X axis and in a pitch direction PITCH around the Y axis. Therefore, the gimbal mechanism 7 is a swing support mechanism to swingably support the movable body 5 around the X axis and the Y axis via the rotation support mechanism 6.

The optical unit with a shake correction function 1 includes a flexible printed board 9 connected to the movable body 5. The flexible printed board 9 is pulled out from the movable body 5 in the +X direction. An end portion of the flexible printed board 9 in the +X direction is supported by a board support part 100 provided on the fixed body 8. The flexible printed board 9 is pulled out to the outside of the fixed body 8, and is attached with an unillustrated connector. The flexible printed board 9 is connected, via the connector, to a substrate of an optical device mounted with the optical unit with a shake correction function 1.

As illustrated in FIGS. 2 to 4, the optical unit with a shake correction function 1 includes a shake correction magnetic drive mechanism 10 to rotate the movable body 5 around the first axis R1 and the second axis R2. The shake correction magnetic drive mechanism 10 includes a first shake correction magnetic drive mechanism 11 (see FIGS. 2 and 3) to generate a driving force around the X axis to the movable body 5 and a second shake correction magnetic drive mechanism 12 (see FIG. 4) to generate a driving force around the Y axis to the movable body 5. The first shake correction magnetic drive mechanism 11 is arranged in the −X direction of the movable body 5. The second shake correction magnetic drive mechanism 12 is arranged in the −Y direction of the movable body 5.

As illustrated in FIGS. 2 and 3, the optical unit with a shake correction function 1 includes a rolling correction magnetic drive mechanism 13 to rotate the movable body 5 around the optical axis L. The rolling correction magnetic drive mechanism 13 is arranged in the +Y direction of the movable body 5. The optical unit with a shake correction function 1 includes a flexible printed board 15 to feed power to the shake correction magnetic drive mechanism 10 and the rolling correction magnetic drive mechanism 13. The flexible printed board 15 is attached to the fixed body 8.

Movable Body

As illustrated in FIGS. 3 to 5, the movable body 5 includes the camera module 4 and a metal holder 16 to surround the camera module 4. The holder 16 includes a holder frame part 161 to surround an outer peripheral side of the camera module 4, a holder end plate part 162 that bends from the end of the holder frame part 161 in the +Z direction to an inner peripheral side, and a holder flange part 163 that bends from the end of the holder frame part 161 in the −Z direction to an outer peripheral side. The camera module 4 includes a lens barrel 4a projecting in the +Z direction from a circular opening part 164 provided at a center of the holder end plate part 162. The lens 2 (see FIG. 5) is housed in the lens barrel 4a. The flexible printed board 9 is pulled out, in the +X direction, from the end of the camera module 4 in the −Z direction. The flexible printed board 9 includes a wiring pattern connected to the image pickup element 3 (see FIG. 5) arranged inside the camera module 4.

As illustrated in FIGS. 3 and 4, a first shake correction magnet 31 is fixed to a side surface of the movable body 5 in the −X direction. As illustrated in FIG. 4, a second shake correction magnet 32 is fixed to a side surface of the movable body 5 in the −Y direction. The first shake correction magnet 31 and the second shake correction magnet 32 are polarized and magnetized in the Z-axis direction. As illustrated in FIG. 3, a rolling correction magnet 33 is fixed to a side surface of the movable body 5 in the +Y direction. The rolling correction magnet 33 is magnetized in three poles in a circumferential direction. The first shake correction magnet 31, the second shake correction magnet 32, and the rolling correction magnet 33 abut against the holder flange part 163 from the +Z direction to be positioned in the Z-axis direction.

Fixed Body

As illustrated in FIGS. 2 and 5, the fixed body 8 includes a case 19 to surround an outer peripheral side of the movable body 5, a base 20 fixed to the case 19 from the −Z direction, and a cover 21 to cover the case 19 from the +Z direction. The case 19, the base 20, and the cover 21 are made of metal. The case 19 is housed between the base 20 and the cover 21. As illustrated in FIGS. 1 and 5, parts of the movable body 5, the rotation support mechanism 6, and the gimbal mechanism 7 protrude from an opening part 21a of the cover 21 in the +Z direction.

The fixed body 8 includes a wiring case 22 to cover the flexible printed board 9 from the +Z direction, and a wiring cover 23 to cover a surface of the wiring case 22 in the +Z direction. The wiring case 22 is made of resin, and the wiring cover 23 is made of metal. The base 20 extends from the case 19 in the +X direction and covers the wiring case 22 from the −Z direction. As illustrated in FIG. 5, the flexible printed board 9 is housed between the base 20 and the wiring cover 23.

As illustrated in FIGS. 3 and 4, a side surface of the case 19 in the −X direction is fixed with a first shake correction coil 34. As illustrated in FIG. 4, a side surface of the case 19 in the −Y direction is fixed with a second shake correction coil 35. The first shake correction coil 34 and the second shake correction coil 35 are oval air-core coils long in a circumferential direction. As illustrated in FIG. 3, a side surface of the case 19 in the +Y direction are fixed with two rolling correction coils 36 and 37 side by side in the circumferential direction. The first shake correction coil 34, the second shake correction coil 35, and the rolling correction coils 36 and 37 are electrically connected to the flexible printed board 15. The flexible printed board 15 is routed along the side surface of the case 19 in the −Y direction, the side surface thereof in the −X direction, and the side surface thereof in the +Y direction in this order.

As illustrated in FIGS. 3 to 5, the case 19 includes a case side wall 18 arranged in the +X direction of the movable body 5, and the case side wall 18 includes a case notch 17 obtained by cutting, in the +Z direction, an edge extending in the −Z direction. The flexible printed board 9 pulled out from the movable body 5 is pulled out in the +X direction of the case 19 through the case notch 17.

As illustrated in FIGS. 3 and 4, each of diagonal portions in the second axis R2 direction in the case 19 is fixed with a gimbal frame receiving member 83. Each gimbal frame receiving member 83 includes a sphere 84 located on an outer peripheral side (side opposite to the movable body 5) of the case 19 and a thrust receiving member 85 fixed to the outer peripheral side of the case 19 to support the sphere 84 at a position apart from the case 19 on the second axis R2. The sphere 84 is positioned in a sphere holding hole 86 provided in the thrust receiving member 85, and projects from the thrust receiving member 85 toward the case 19.

Rotation Support Mechanism

As illustrated in FIGS. 3 to 5, the movable body 5 is fixed with a stopper member 40 and a second stopper member 41 to face the stopper member 40 in the Z-axis direction. The stopper member 40 is made of metal and is fixed to the holder end plate part 162. As illustrated in FIG. 5, the stopper member 40 includes a first annular groove 40a surrounding the optical axis L. The rotation support mechanism 6 is provided with a plate roll 42 including the first annular groove 40a provided in the stopper member 40 and a second annular groove 42a to face the first annular groove 40a in the Z-axis direction. The rotation support mechanism 6 includes a plurality of spheres 43 to contact the first annular groove 40a and the second annular groove 42a to roll between the movable body 5 and the plate roll 42, and an annular retainer 44 to rotatably hold each of the spheres 43. The rotation support mechanism 6 includes a pressurization mechanism 45 to apply a force for bringing the first annular groove 40a and the second annular groove 42a closer to each other in the Z-axis direction.

As illustrated in FIGS. 3 and 4, the plate roll 42 includes a plate roll annular part 47 surrounding the optical axis L, a pair of plate roll extending parts 48 that protrudes from the plate roll annular part 47 on both sides in the first axis R1 direction and is bent in the −Z direction, and plate roll protrusion parts 49 protruding from the plate roll annular part 47 on the both sides in the direction of the first axis R1. The second annular groove 42a is provided in the plate roll annular part 47.

Each of the spheres 43 is made of metal or ceramics. The retainer 44 is made of resin. The retainer 44 is arranged between the plate roll annular part 47 and the stopper member 40 in the Z-axis direction. As illustrated in FIG. 5, the retainer 44 includes a plurality of sphere holding holes 44a to rotatably hold each of the plurality of spheres 43. The spheres 43 protrude from the retainer 44 in the −Z direction and the +Z direction and contact the first annular groove 40a and the second annular groove 42a.

As illustrated in FIGS. 3 and 4, the pressurization mechanism 45 includes a magnetic member 45a fixed to the plate roll 42 and a pressurizing magnet 45b fixed to the stopper member 40. When the magnetic member 45a is attracted by the pressurizing magnet 45b, the plate roll 42 is urged toward the stopper member 40.

Each of tip ends of the pair of plate roll extending parts 48 provided in the plate roll 42 extends on an outer periphery side of the movable body 5 in the Z-axis direction. Each of the plate roll extending part 48 is fixed with the gimbal frame receiving member 83. Each gimbal frame receiving member 83 is the same member as the gimbal frame receiving member 83 fixed to the case 19. Each gimbal frame receiving member 83 includes the sphere 84 located on an outer peripheral side (side opposite to the movable body 5) of each of the plate roll extending parts 48 and the thrust receiving member 85 fixed on an outer peripheral side of the plate roll extending part 48 to support the sphere 84 at a position apart from the plate roll extending part 48 on the first axis R1. The sphere 84 is positioned in the sphere holding hole 86 provided in the thrust receiving member 85, and protrudes from the thrust receiving member 85 toward the plate roll extending part 48.

The stopper member 40 and the second stopper member 41 regulate an angle range in which the movable body 5 rotates around the optical axis L. The stopper member 40 includes a first bend part 401 bending in the +Z direction from an outer peripheral edge in the +X direction, a second bend part 402 bending in the +Z direction from an outer peripheral edge in the −Y direction, and a third bend part 403 bending in the +Z direction from an outer peripheral edge in the +Y direction. The second stopper member 41 includes a first connection part 411 bending in the +Z direction from the outer peripheral edge in the +X direction, a second connection part 412 bending in the +Z direction from the outer peripheral edge in the −Y direction, and a third connection part 413 bending in the +Z direction from the outer peripheral edge in the +Y direction. The first connection part 411 is connected to the first bend part 401, the second connection part 412 is connected to the second bend part 402, and the third connection part 413 is connected to the third bend part 403. As a result, the second stopper member 41 is fixed to the stopper member 40.

As illustrated in FIG. 4, an end edge on one side of the first bend part 401 of the stopper member 40 in a circumferential direction faces the one plate roll extending part 48 with a gap from the one side in the circumferential direction. An end edge on the other side of the first bend part 401 of the stopper member 40 in the circumferential direction faces the one plate roll protrusion part 49 with a gap from the other side in the circumferential direction. Therefore, an angle range in which the plate roll 42 rotates is regulated by the stopper member 40, and thus, an angle range in which the movable body 5 rotates around the Z axis is regulated.

Gimbal Mechanism

As illustrated in FIGS. 2 to 4, the gimbal mechanism 7 includes a gimbal frame 75, a first connection mechanism 76, and a second connection mechanism 77. The first connection mechanism 76 rotatably connects the gimbal frame 75 and the plate roll 42 around the first axis R1. The second connection mechanism 77 rotatably connects the gimbal frame 75 and the case 19 around the second axis R2. When the gimbal mechanism 7 is configured, the movable body 5 is supported by the case 19 via the gimbal mechanism 7 and the rotation support mechanism 6. As a result, the movable body 5 is capable of swinging around an intersection where the optical axis L, the first axis R1, and the second axis R2 intersect.

The gimbal frame 75 is made of a metal leaf spring. As illustrated in FIGS. 3 and 4, the gimbal frame 75 includes a gimbal frame main body part 70 located in the +Z direction of the plate roll 42, a pair of first gimbal frame extending parts 71 extending in the −Z direction after protruding from the gimbal frame main body 70 toward both sides in the first axis R1 direction, and a pair of second gimbal frame extending parts 72 extending in the −Z direction after protruding from the gimbal frame main body 70 toward both sides in the second axis R2 direction. At a center of the gimbal frame main body 70, an opening part 73 penetrating in the Z-axis direction is provided.

Each of the pair of first gimbal frame extending parts 71 bends in a direction inclined in the −Z direction after extending in a direction apart from the gimbal frame main body 70 in the first axis R1 direction, and extends in the Z-axis direction after bending in the −Z direction. Such a first gimbal frame extending part 71 is provided with a first concave curved surface 81 at a tip end portion extending in the Z-axis direction. The first concave curved surface 81 is arranged on the first axis R1 and is recessed toward an inner peripheral side (that is, toward the movable body 5).

Each of the pair of second gimbal frame extending parts 72 bends in the −Z direction after extending in a direction apart from the gimbal frame main body 70 in the second axis R2 direction, extends to an outer peripheral side after bending in the second axis R2 direction, and extends in the Z-axis direction after bending, again, in the −Z direction. Such a second gimbal frame extending part 72 is provided with a second concave curved surface 82 at a tip end portion extending in the Z-axis direction. The second concave curved surface 82 is arranged on the second axis R2 and is recessed toward the inner peripheral side (that is, toward the movable body 5).

The first connection mechanism 76 is configured so that the sphere 84 fixed to the plate roll extending part 48 via the thrust receiving member 85 contacts the first concave curved surface 81 provided on the first gimbal frame extending part 71. The sphere 84 makes a point contact with the first concave curved surface 81 on the first axis R1. As a result, the movable body 5 supported by the rotation support mechanism 6 is rotatably supported around the first axis R1 by the gimbal mechanism 7. The first gimbal frame extending part 71 is bent toward the inner circumference during assembly. As a result, the first gimbal frame extending part 71 is urged to an outer peripheral side, and thus, it is possible to maintain a state where the first concave curved surface 81 and the sphere 84 are in contact.

The second connection mechanism 77 is configured so that the sphere 84 fixed to the case 19 via the thrust receiving member 85 contacts the second concave curved surface 82 provided in the second gimbal frame extending part 72. The sphere 84 makes a point contact with the second concave curved surface 82 on the second axis R2. As a result, the movable body 5 supported by the rotation support mechanism 6 is rotatably supported around the second axis R2 by the gimbal mechanism 7. The second gimbal frame extending part 72 is bent toward the inner circumference during assembly. As a result, the second gimbal frame extending part 72 is urged to the outer peripheral side, and thus, it is possible to maintain a state where the second concave curved surface 82 and the sphere 84 are in contact.

Shake Correction Magnetic Drive Mechanism and Rolling Correction Magnetic Drive Mechanism When the gimbal mechanism 7 is configured, the first shake correction magnet 31 fixed to the side surface of the movable body 5 in the −X direction and the first shake correction coil 34 fixed to the case 19 configure the first shake correction magnetic drive mechanism 11. Therefore, when power is fed to the first shake correction coil 34, the movable body 5 rotates around the Y axis. The second shake correction magnet 32 fixed to the side surface of the movable body 5 in the −Y direction and the second shake correction coil 35 fixed to the case 19 configure the second shake correction magnetic drive mechanism 12. Therefore, when power is fed to the second shake correction coil 35, the movable body 5 rotates around the X axis. The shake correction magnetic drive mechanism 10 combines the rotation of the movable body 5 around the Y axis by the first shake correction magnetic drive mechanism 11 and the rotation of the movable body 5 around the X axis by the second shake correction magnetic drive mechanism 12 to rotate the movable body 5 around the first axis R1 and around the second axis R2.

When the gimbal mechanism 7 is configured, the rolling correction magnet 33 fixed to the side surface of the movable body 5 in the +Y direction and the two rolling correction coils 36 and 37 fixed to the case 19 configure the rolling correction magnetic drive mechanism 13. Therefore, when power is fed to the two rolling correction coils 36 and 37, the movable body 5 rotates around the optical axis L.

Flexible Printed Board

Figure 6:
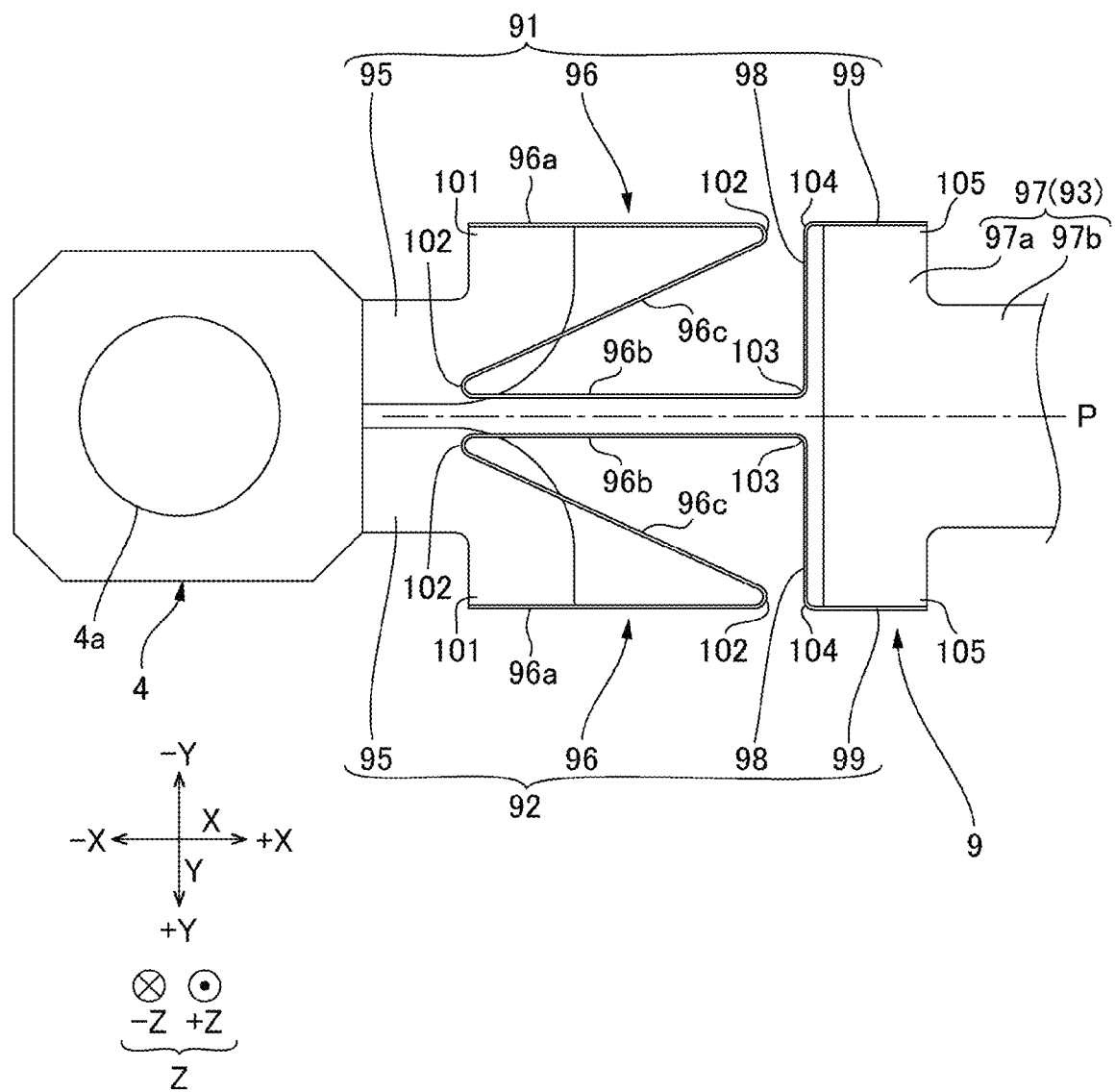
FIG. 6 is a plan view of a camera module and a flexible printed board.
Figure 7:
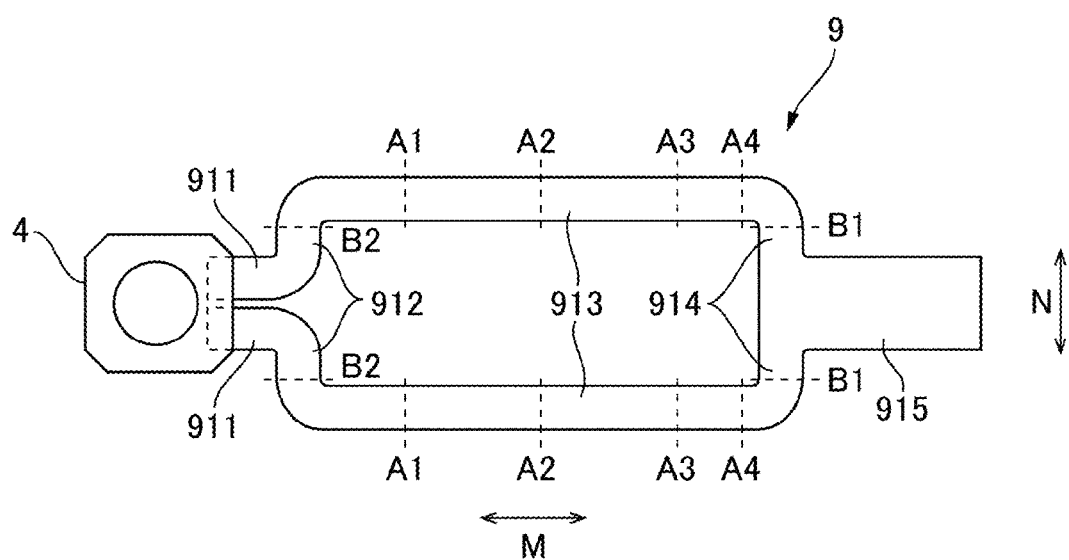
FIG. 7 is a development view obtained when the flexible printed board is developed on a plane.

FIG. 6 is a plan view of the camera module 4 and the flexible printed board 9. FIG. 7 is a development view obtained when the flexible printed board 9 is developed on a plane. The flexible printed board 9 is pulled out from the movable body 5 in the +X direction. As illustrated in FIG. 5, the fixed body 8 includes the board support part 100 to support the flexible printed board 9 at a position apart from the movable body 5 in the X-axis direction. The +X direction is the X-axis direction, which is a first direction from the camera module 4 toward the board support part 100.

As illustrated in FIG. 6, the flexible printed board 9 includes a first board portion 91 and a second board portion 92 arranged in the Y-axis direction, and a third board portion 93 to connect an end portion of the first board portion 91 in the +X direction (first direction) and an end portion (first direction) of the second board portion 92 in the +X direction. The first board portion 91 is located in the −Y direction of the second board portion 92. The first board portion 91 and the second board portion 92 have a shape symmetrical with respect to a virtual plane P parallel to the XU plane including the X axis and the Z axis between the first board portion 91 and the second board portion 92.

The first board portion 91 and the second board portion 92 include first extending parts 95 and meandering parts 96, respectively. Each of the first extending parts 95 is pulled out from the movable body 5 in the +X direction (first direction)

along the XY plane including the X axis and the Y axis. In the present embodiment, the first extending part 95 is pulled out from a bottom of the camera module 4 into the +X direction. An end of the first extending part 95 in the +X direction has a shape protruding in the Y-axis direction along the XY plane. Each of the meandering parts 96 extends in the Y-axis direction while meandering in the X-axis direction after being curved in the Z-axis direction from an end of the first extending part 95 in the Y-axis direction. That is, the meandering part 96 of the first board portion 91 extends in the +Y direction while meandering in the X-axis direction after being curved in the +Z direction from the end of the first extending part 95 in the −Y direction. On the other hand, the meandering part 96 of the second board portion 92 extends in the −Y direction while meandering in the X-axis direction after being curved in the +Z direction from an end of the first extending part 95 in the +Y direction.

Each of the meandering parts 96 includes a first straight line part 96a and a second straight line part 96b extending substantially parallel to the XZ plane along the XZ plane, and a third straight part 96c extending from an end of the first straight part 96a in the +X direction to an end of the second straight part 96b in the −X direction. The first straight line part 96a is connected to the first extending part 95 and the first straight line part 96a is connected to the third extending part 98. The third straight part 96c extends in a direction inclined with respect to the X axis and the Y axis. That is, the meandering part 96 of the present embodiment has a shape in which the flexible board included in the flexible printed board 9 is folded back twice. The number of times the meandering part 96 is folded back is not limited to two, and may be other numbers.

In the +X direction (first direction) of each of the meandering parts 96, a second extending part 97 extending in the +X direction along the XY plane is arranged. In the present embodiment, the third board portion 93 connecting the first board portion 91 and the second board portion 92 is configured by the second extending part 97. The second extending part 97 includes a first portion 97a connected with the first board portion 91 and the second board portion 92, and a second portion 97b extending in the +X direction from a center of the first portion 97a in the Y-axis direction. The second portion 97b is narrower in width in the Y-axis direction than the first portion 97a.

As illustrated in FIG. 5, in a state where the movable body 5 is stopped at an origin position where the optical axis L of the camera module 4 and the Z-axis direction coincide with each other, the first extending part 95 and the second extending part 97 are located on the same plane. The first extending part 95 extends, after being pulled out from the bottom of the camera module 4, in the +X direction of the holder 16 through a holder notch part 165 obtained by cutting an end of the holder frame part 161 in the −Z direction and extends inward of the wiring case 22 through a case notch 17 obtained by cutting a part of the case 19. The meandering part 96 is housed in the wiring case 22. The second extending part 97 is fixed to the board support part 100 provided at an end in the +X direction of the wiring case 22.

As illustrated in FIGS. 2 and 5, the wiring case 22 includes a wiring case side wall 24 extending in the Y-axis direction at an end in the +X direction. The wiring case side wall 24 includes a wiring case notch part 25 obtained by cutting an edge of the −Z direction in the +Z direction. The second portion 97b of the second extending part 97 is pulled out of the wiring case 22 through the wiring case notch part 25. The board support part 100 is an end surface provided at an edge of the wiring case notch part 25 in the +Z direction. As illustrated in FIG. 5, the second extending part 97 is fixed to the board support part 100 by the plate-shaped board fixing member 110.

The first board portion 91 and the second board portion 92 include third extending parts 98 and fourth extending parts 99, respectively. The third extending part 98 extends in the Y-axis direction after being curved in the Y-axis direction from an end of the meandering part 96 in the +X direction (first direction). That is, the third extending part 98 of the first board portion 91 extends in the −Y direction after being curved in the −Y direction from the end of the meandering part 96 in the +X direction. On the other hand, the third extending part 98 of the second board portion 92 extends in the +Y direction after being curved in the +Y direction from the end of the meandering part 96 in the +X direction.

The fourth extending part 99 extends in the +X direction after being curved in the +X direction (first direction) from the end of the third extending part 98 in the Y-axis direction. That is, the fourth extending part 99 of the first board portion 91 extends in the +X direction after being curved in the +X direction from the end of the third extending part 98 in the −Y direction. On the other hand, the fourth extending part 99 of the second board portion 92 extends in the +X direction after being curved in the +X direction from the end of the third extending part 98 in the +Y direction.

The second extending part 97 extends along the XY plane after being curved in the Y-axis direction from the end of the fourth extending part 99 in the Z-axis direction. That is, the first portion 97a of the second extending part 97 extends along the XY plane after being curved in the +Y direction from the end, in the −Z direction, of the fourth extending part 99 of the first board portion 91, and extends along the XY plane after being curved in the −Y direction from the end, in the −Z direction, of the fourth extending part 99 of the second board portion 92. With the third extending part 98 and the fourth extending part 99, the meandering part 96 extending along a plane vertical to the XY plane and the second extending part 97 extending along the XY plane are connected.

The flexible printed board 9 configures the shape by a flat surface portion and a curved portion curved from the end of the flat surface portion. That is, the first extending part 95 and the second extending part 97 are a flat surface portion along the XY plane. The third extending part 98 is a flat surface portion along the YZ plane, and the fourth extending part 99 is a flat surface portion along the XZ plane. The meandering part 96 includes the first straight line part 96a and the second straight line part 96b that are flat surface portions along the XZ plane, and the third straight part 96c that is a flat surface portion inclined with respect to the XZ plane.

The curved portion includes a first curved portion 101 curving in the Z-axis direction from an end of the first extending part 95 in the Y-axis direction to be connected to the meandering part 96, a second curved portion 102 provided at each of two folded positions in the meandering part 96, a third curved portion 103 curving in the Y-axis direction from an end of the meandering part 96 in the +X direction (first direction) to be connected to the third extending part 98, a fourth curved portion 104 curving in the +X direction from an end of the third extending part 98 in the Y-axis direction to be connected to the fourth extending part 99, and a fifth curved portion 105 curving in the Y-axis direction from an end of the fourth extending part 99 in the Z-axis direction to be connected to the second extending part 97.

As illustrated in FIG. 7, a plan shape obtained when the flexible printed board 9 is developed is a shape including a pair of first linear board portions 911 extending in parallel in a straight line, a pair of one-side protruding board portions 912 protruding outward in a facing direction N in which the pair of first linear board portions 911 from one end portions in an extending direction M of each of the first linear board portions 911, a pair of second linear board portions 913 extending in the extending direction M from an outer end portion in the facing direction N of each of the one-side protruding board portions 912, a pair of alternate-side protruding board portions 914 protruding inward in the facing direction N from one end portion in the extending direction M of each of the second linear board portions 913, and a connection board portion 915 to connect the pair of alternate-side protruding board portions 914 on the other side in the extending direction M of the pair of the second linear board portions 913.

When the flexible printed board 9 is processed from the developed shape illustrated in FIG. 7 to a three-dimensional shape illustrated in FIG. 6, the second linear board portions 913 are firstly folded at four folding positions A1, A2, A3, and A4 illustrated in FIG. 7 to form the meandering part 96 and the third extending part 98. After that, the one-side protruding board portion 912 and the alternate-side protruding board portion 914 are each folded in the same direction at the two folding positions B1 and B2. As a result, the meandering part 96 and the third extending part 98 are rotated by 90° inward in the facing direction N to be arranged in the state illustrated in FIG. 6, and the fourth extending part 99 is formed. Thus, a three-dimensional shape illustrated in FIG. 6 is completed.

Operation and Effect

Figure 8A:
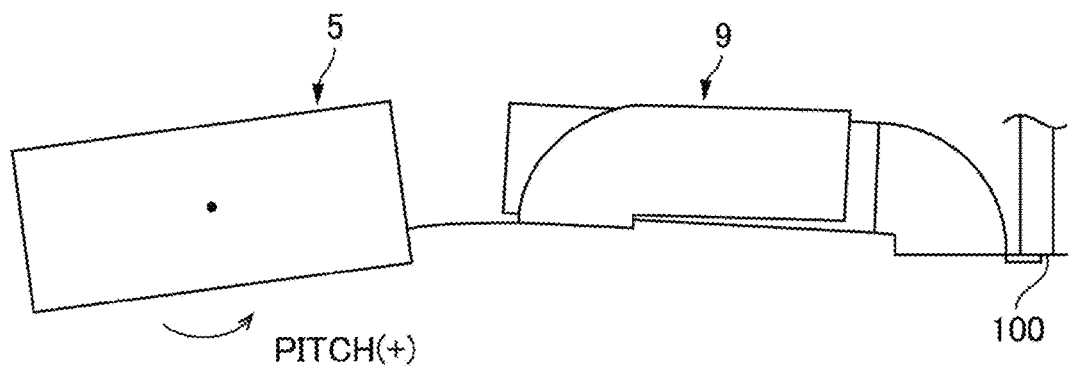
FIGS. 8A and 8B are an explanatory diagram and a stress diagram of the shape of a flexible printed board obtained when the movable body rotates to one side around an X axis.
Figure 8B:
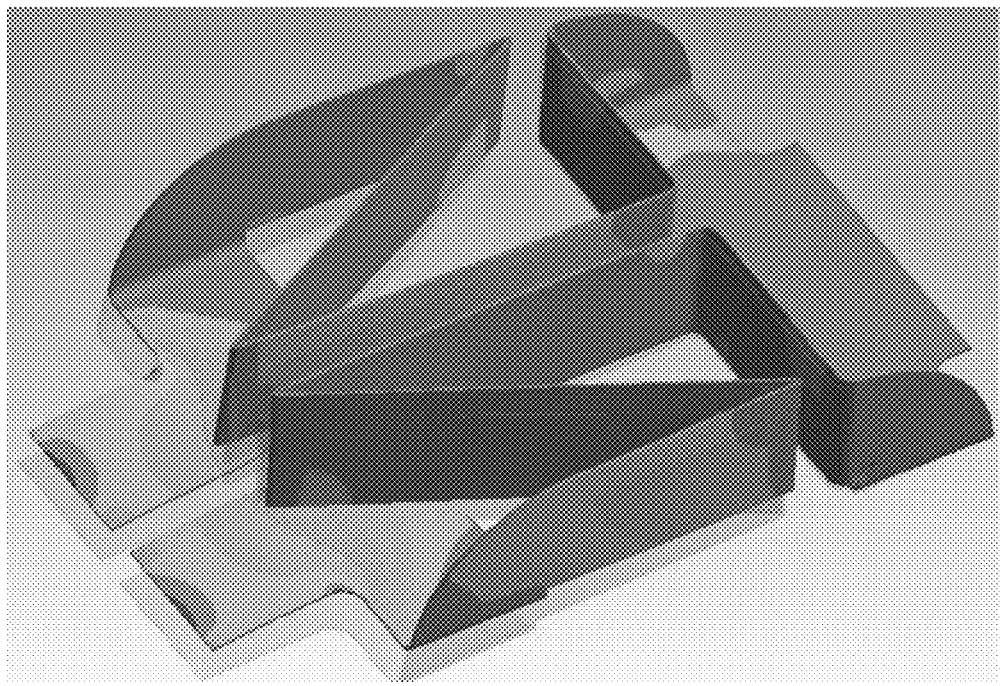
Figure 9A:
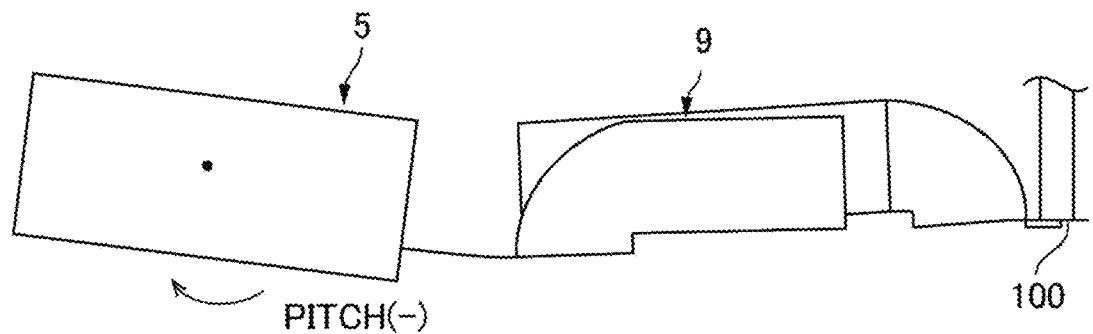
FIGS. 9A and 9B are an explanatory diagram and a stress diagram of the shape of a flexible printed board obtained when the movable body rotates to the other side around the X axis.
Figure 9B:
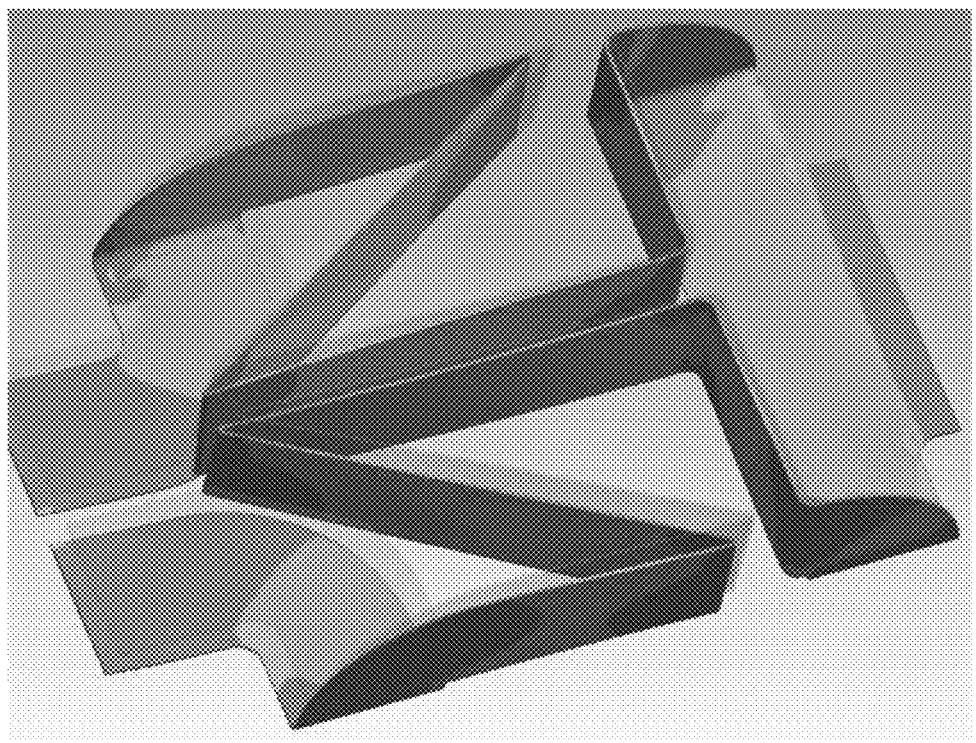
Figure 10A:
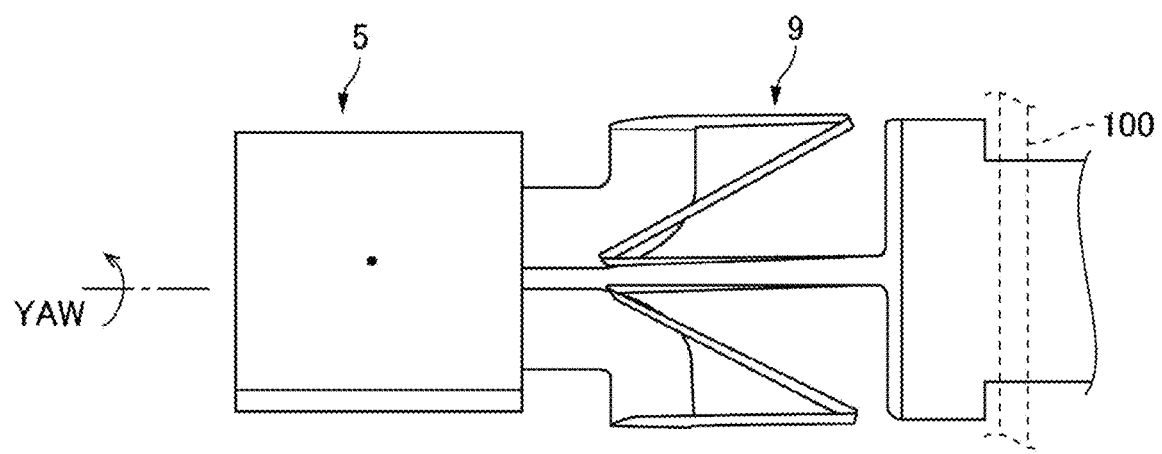
FIGS. 10A and 10B are an explanatory diagram and a stress diagram of a shape of the flexible printed board obtained when the movable body rotates around a Y axis.
Figure 10B:
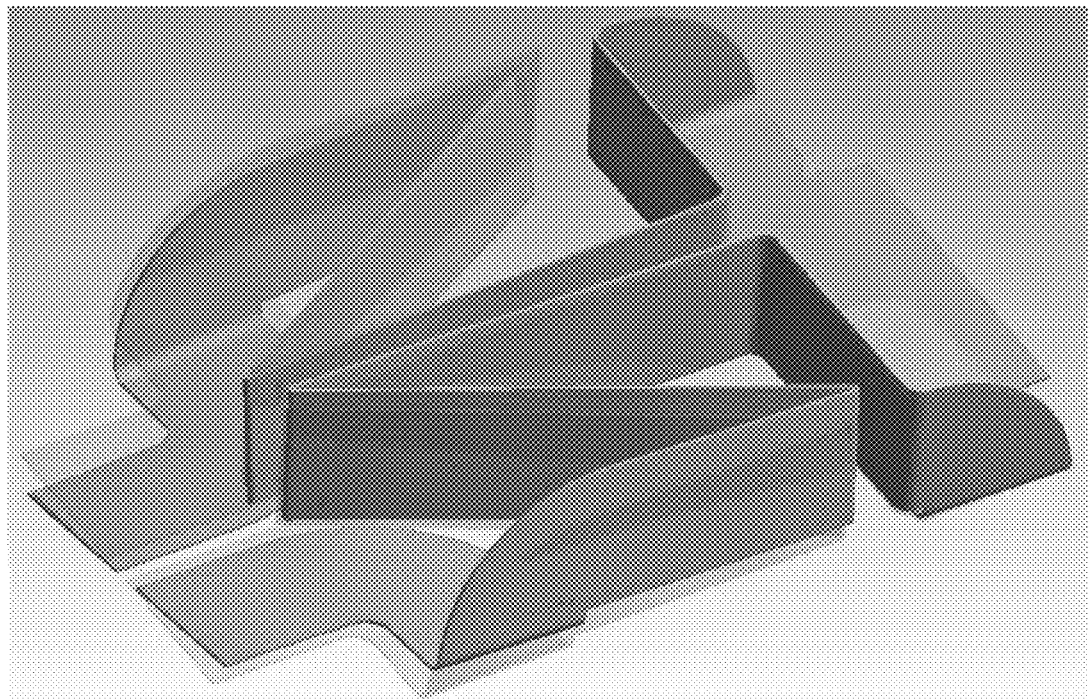
Figure 11A:
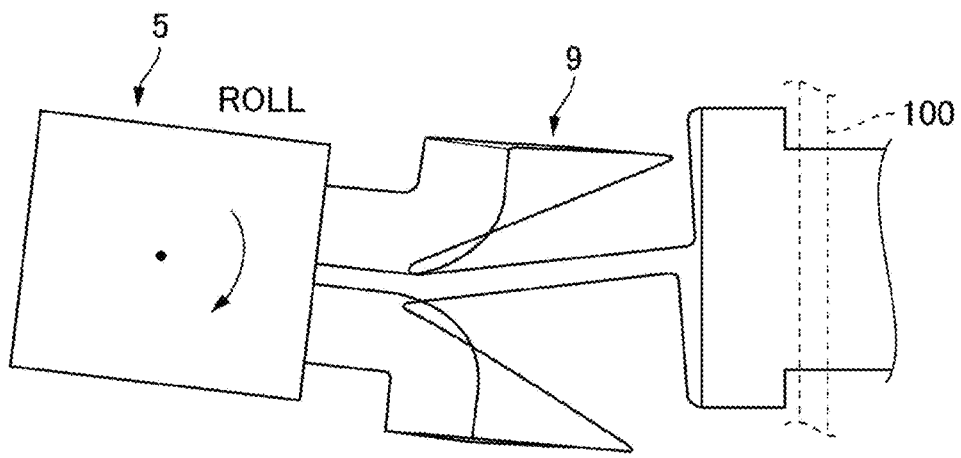
FIGS. 11A and 11B are an explanatory diagram and a stress diagram of a shape of the flexible printed board obtained when the movable body rotates around a Z axis.
Figure 11B:
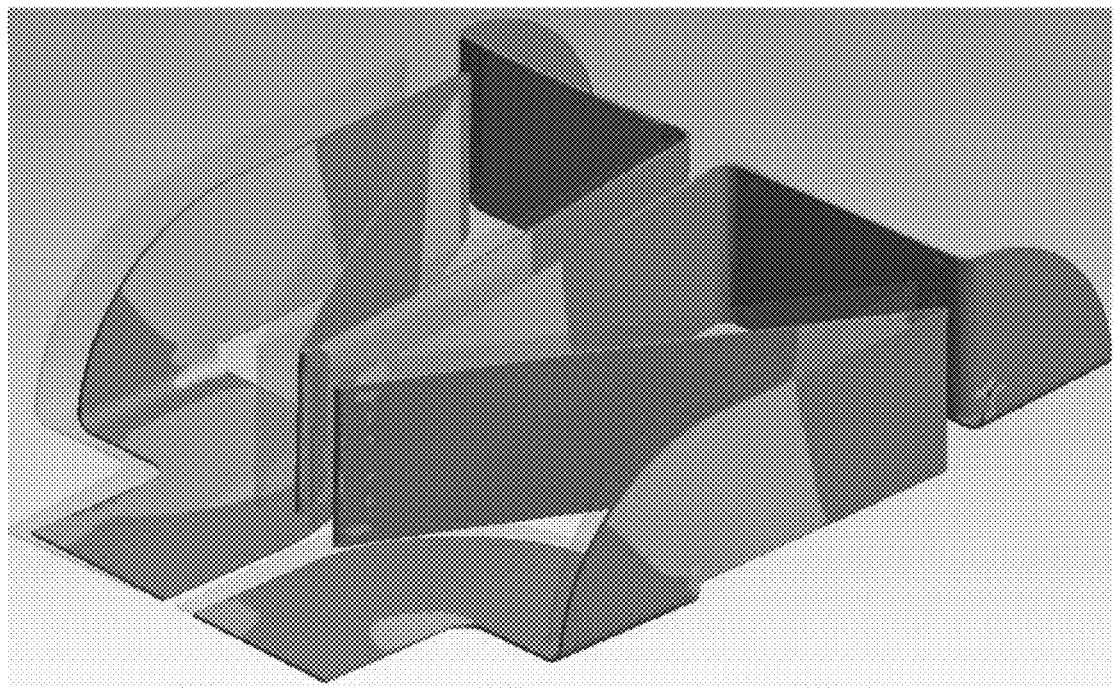

FIGS. 8A and 8B are an explanatory diagram and a stress diagram of a shape of the flexible printed board 9 obtained when the movable body 5 rotates to one side around the X axis. FIGS. 9A and 9B are an explanatory diagram and a stress diagram of a shape of the flexible printed board 9 obtained when the movable body 5 rotates to the other side around the X axis. FIGS. 10A and 10B are an explanatory diagram and a stress diagram of a shape of the flexible printed board 9 obtained when the movable body 5 rotates around the Y axis. FIGS. 11A and 11B are an explanatory diagram and a stress diagram of a shape of the flexible printed board 9 obtained when the movable body 5 rotates around the Z axis. FIGS. 8A, 9A, 10A, and 11A illustrate the shape of the flexible printed board 9. FIGS. 8B, 9B, 10B, and 11B indicate that a stress is small in a dark shade portion and the stress is large in a light shade portion.

In the present embodiment, the flexible printed board 9 connected to the movable body 5 includes the meandering part 96, the first extending part 95, and the second extending part 97. Therefore, when the movable body 5 rotates about the X axis, the flexible printed board 9 is likely to bend. For example, as illustrated in FIGS. 8A, 8B, 9A, and 9B, when the movable body 5 rotates in the pitch direction PITCH around the Y axis, the first extending part 95 and the second extending part 97 are likely to bend in the Z-axis direction, and therefore, the meandering part 96 is prevented from moving significantly in the Z-axis direction.

In the present embodiment, the meandering part 96 of the flexible printed board 9 has a shape extending in the Y-axis direction while meandering in the X-axis direction. Therefore, when the movable body 5 rotates about the Y axis and when the movable body 5 rotates about the Z axis, the flexible printed board 9 is likely to bend. For example, as illustrated in FIGS. 10A and 10B, when the movable body 5 rotates in the yaw direction YAW around the X axis, the meandering part 96 is likely to bend to generally fall in the Y-axis direction. As illustrated in FIGS. 11A and 11B, when the movable body 5 rotates in the roll direction ROLL around the optical axis L, the meandering part 96 is likely to bend to expand and contract in the Y-axis direction.

As understood from shades of the stress diagrams illustrated in FIGS. 8B, 9B, 10B, and 11B, with the shape of the meandering part 96 in the present embodiment, the stress generated when the movable body 5 rotates in the roll direction ROLL is small. The stress generated when the movable body 5 rotates in the yaw direction YAW is generally larger than the stress generated when the movable body 5 rotates in the roll direction ROLL. The stress generated when the movable body 5 rotates in the pitch direction PITCH is small in a region other than the first extending part 95 and the second extending part 97.

As described above, the optical unit with a shake correction function 1 according to the present embodiment includes the camera module 4, and is provided with the movable body 5 rotatably supported around the X axis, the Y axis, and the Z axis when three axes orthogonal to one another are the X axis, the Y axis, and the Z axis, the flexible printed board 9 pulled out from the movable body 5, and the board support part 100 to support the flexible printed board 9 at a position apart from the movable body 5 in the X-axis direction. If a direction from the camera module 4 toward the board support part 100 is the +X direction (first direction) in the X-axis direction, the flexible printed board 9 includes the first extending parts 95 pulled out from the movable body 5 in the +X direction (first direction) along the XY plane including the X axis and the Y axis, the meandering parts 96 extending in the Y-axis direction while meandering in the X-axis direction after being curved in the Z-axis direction from the end in the Y-axis direction of the first extending parts 95, and the second extending part 97 being arranged in the +X direction (first direction) of the meandering part 96, extending in the +X direction along the XY plane, and being fixed to the board support part 100.

In the present embodiment, the flexible printed board 9 connected to the movable body 5 includes the meandering parts 96, the first extending parts 95, and the second extending part 97, and the second extending part 97 is fixed to the board support part 100. Therefore, it is possible to prevent the rotation of the movable body 5 from being hindered by the flexible printed board 9 when the movable body 5 rotates around the X axis, Y axis, and Z axis. That is, the meandering parts 96, which extend in the Y-axis direction while meandering in the X-axis direction, are likely to bend when the movable body 5 rotates around the X axis and the Z axis. Both the first extending parts 95 pulled out from the camera module 4 and the second extending part 97 fixed to the board support part 100, which extend along the XY plane, are likely to bend in the Z-axis direction when the movable body 5 rotates around the Y axis. Therefore, it is possible to prevent a whole of the flexible printed board 9 from moving significantly in the Z-axis direction when the movable body 5 rotates around the Y axis. Therefore, it is advantageous for a reduction in size of the optical unit with a shake correction function 1 in the Z-axis direction.

In the present embodiment, the flexible printed board 9 includes the third extending parts 98 extending in the Y-axis direction after being curved in the Y-axis direction from the end of the meandering part 96 in the +X direction (first direction), and the fourth extending parts 99 extending in the +X direction (first direction) after being curved in the +X direction (first direction) from the end of the third extending parts 98 in the Y-axis direction, in which the second extending part 97 extends along the XY plane after being curved in the Y-axis direction from the end of the fourth extending parts 99 in the Z-axis direction. Thus, it is possible to arrange both the first extending parts 95 and the second extending part 97 along the XY plane. It is possible to provide a large space for arranging the meandering parts 96 in a dead space between the first extending parts 95 and the second extending part 97. Further, it is possible for the meandering parts 96 to easily bend when the movable body 5 rotates around the Z axis.

In the present embodiment, the flexible printed board 9 includes the first board portion 91 and the second board portion 92 arranged in the Y-axis direction, and the third board portion to connect the end portion of the first board portion 91 in the +X direction (first direction) and the end portion of the second board 92 in the +X direction (first direction). The first board portion 91 and the second board portion 92 have a shape symmetrical with respect to the virtual surface P parallel to the XZ plane between the first board portion 91 and the second board portion 92. Each of the first board portion 91 and the second board portion 92 includes the first extending part 95, the meandering part 96, the third extending part 98, and the fourth extending part 99, where the third board portion includes the second extending part 97. In such a configuration, it is possible to distribute the wiring pattern connected to the movable body 5 to each of the first board portion 91 and the second board portion 92, and thus, it is possible to reduce width dimensions of the first board portion 91 and the second board portion 92. Therefore, it is possible to easily bend the flexible printed board 9 to easily prevent the flexible printed board 9 from hindering the rotation of the movable body 5. The meandering part 96 is routed in a meandering shape after being curved in the Z-axis direction, and thus, when the width dimensions of the first board portion 91 and the second board portion 92 are reduced in size, it is possible to decrease a height of the meandering part 96 in the Z-axis direction. Therefore, it is advantageous for a reduction in size of the optical unit with a shake correction function 1 in the Z-axis direction. The first board portion 91 and the second board portion 92 have a shape symmetrical with respect to the virtual plane P parallel to the XZ plane, and thus, when the movable body 5 rotates, it is possible to bend the first board portion 91 and the second board portion 92 in the same way. Therefore, the rotation of the movable body 5 is stable. The first board portion 91 and the second board portion 92 are connected by the third board portion. As a result, there is only one flexible printed board 9 fixed to the board support part 100 and pulled out to the outside of the optical unit with a shake correction function 1, and thus, it is easy to perform a connection task of connecting the flexible printed board 9 to an external wiring.

In the present embodiment, the plan shape obtained when the flexible printed board 9 is developed includes the pair of first linear board portions 911 extending in parallel in a straight line, the pair of one-side protruding board portions 912 protruding outward in a facing direction N in which the pair of first linear board portions 911 face each other, from one end portions in an extending direction M of each of the first linear board portions 911, the pair of second linear board portions 913 extending in the extending direction M from an outer end portion in the facing direction N of each of the one-side protruding board portions 912, the pair of alternate-side protruding board portions 914 protruding inward in the facing direction N from one end portion in the extending direction M of each of the second linear board portions 913, and the connection board portion 915 to connect the pair of alternate-side protruding board portions 914 on the other side in the extending direction M of the pair of the second linear board portions 913. Therefore, because of a simple developed shape, it is possible to easily manufacture the flexible printed board 9. A yield obtained when the flexible printed board 9 is manufactured is good, and thus, it is possible to reduce a manufacturing cost. When the three-dimensional flexible printed board 9 is fabricated, after the pair of second linear board portions 913 are folded to form the meandering part 96, the pair of one-side protruding board portions 912 and the pair of alternate-side protruding board portions 914 are folded in the same direction to rotate the meandering part 96 by 90 degrees. Therefore, it is easy to perform a task of processing the flexible printed board 9 into an easy-to-bend three-dimensional shape.

In the present embodiment, the Z axis coincides with the optical axis L of the camera module 4, and thus, when the movable body 5 rotates around the optical axis L, in the pitch direction orthogonal to the optical axis L, and in the yaw direction orthogonal to the optical axis L and the pitch direction, it is possible to prevent the flexible printed board 9 from hindering the movement of the movable body 5.

In the present embodiment, the shake correction magnetic drive mechanism 10 to rotate the movable body 5 around the X axis and the Y axis, and the rolling correction magnetic drive mechanism 13 to rotate the movable body 5 around the Z axis are provided, and when the movable body 5 rotates around the X axis, the Y axis, and the Z axis, the flexible printed board 9 is likely to bend. Therefore, when the movable body 5 is rotated, a load caused by the bending of the flexible printed board 9 is small. Therefore, as a result of the reduced load caused by the bending of the flexible printed board 9, it is possible to reduce a driving force of the shake correction magnetic drive mechanism 10 to rotate the movable body 5 around the X axis and the Y axis. Further, as a result of the reduced load caused by the bending of the flexible printed board 9, it is possible to reduce a driving force of the rolling correction magnetic drive mechanism 13 to rotate the movable body 5 around the Z axis. Therefore, it is possible to keep a low power consumption of the shake correction magnetic drive mechanism 10 and the rolling correction magnetic drive mechanism 13.

Figure 12:
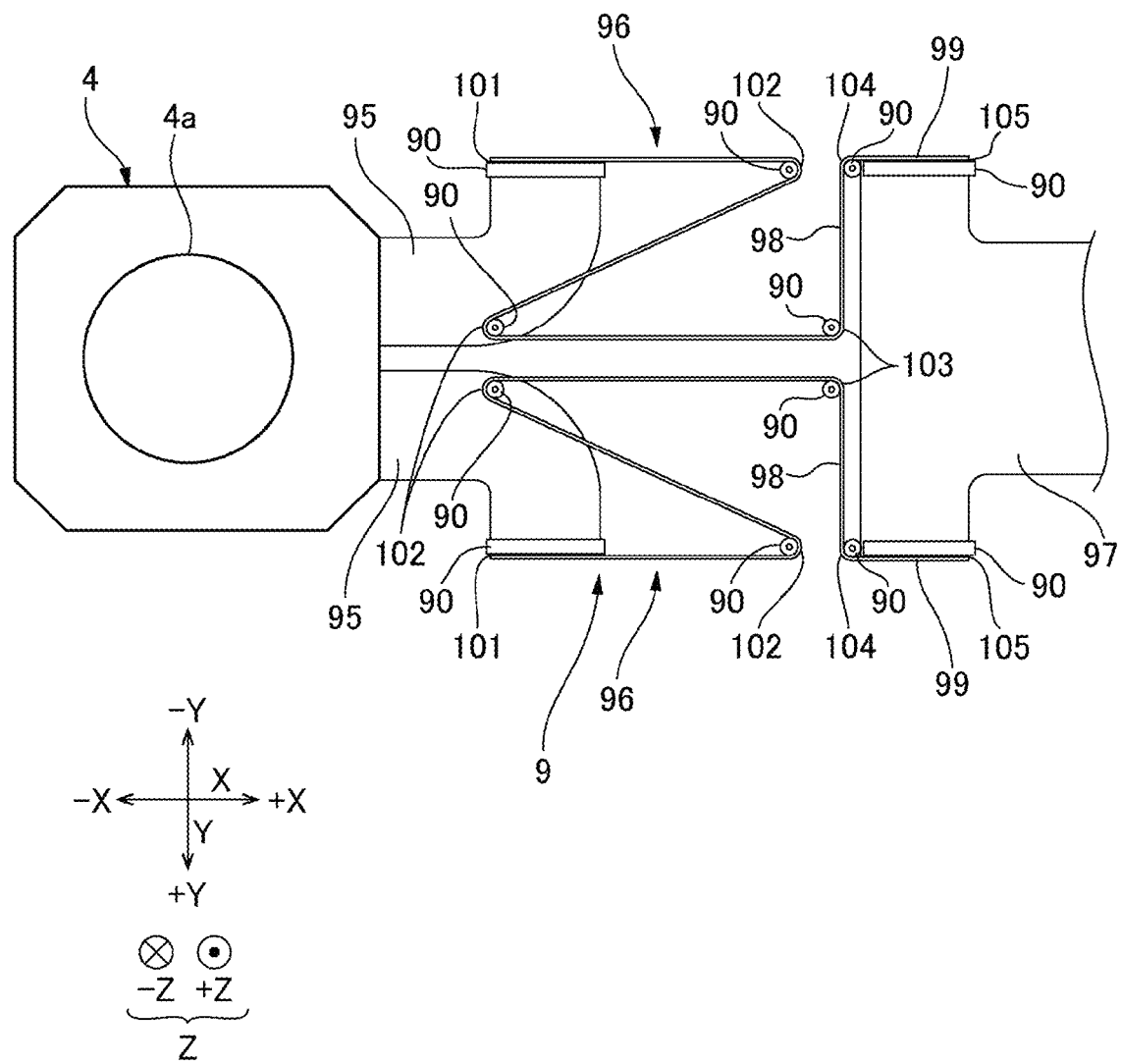
FIG. 12 is a plan view of a flexible printed board and a camera module attached with a curved-shape holding member.

OTHER EMBODIMENTS (1) FIG. 12 is a plan view of the flexible printed board 9 attached with a curved-shape holding member 90, and the camera module 4. The same components as those in the above embodiment are designated by the same reference numerals and the description thereof will be omitted below. In the above embodiment, the flexible printed board 9 includes the flat surface portion and the curved portion curved from the end of the flat surface portion. That is, the flat surface portion is provided in each of the first extending part 95, the meandering part 96, the third extending part 98, the fourth extending part 99, and the second extending part 97. The curved portion includes the first curved portion 101 curving in the Z-axis direction from an end of the first extending part 95 in the Y-axis direction to be connected to the meandering part 96, the second curved portions 102 provided at folded positions of the meandering part 96, the third curved portion 103 curving in the Y-axis direction from and end of the meandering part 96 in the +X direction (first direction) to be connected to the third extending part 98, the fourth curved portion 104 curving in the +X direction (first direction) from the end of the third extending part 98 in the Y-axis direction to be connected to the fourth extending part 99, and the fifth curved portion 105 curving in the Y-axis direction from the end of the fourth extending part 99 in the Z-axis direction to be connected to the second extending part 97. Each of the first curved portion 101, the second curved portion 102, the third curved portion 103, the fourth curved portion 104, and the fifth curved portion 105 is fixed with the curved-shape holding member 90.

The curved-shape holding member 90 illustrated in FIG. 12 is a rod-shaped member having a cylindrical outer peripheral surface. The flexible printed board 9 is wound around the outer peripheral surface of the rod-shaped member. When the curved-shape holding member 90 is used, it is possible to maintain the shape of the flexible printed board 9 in a curved shape, and thus, the shape of the flexible printed board 9 is easily maintained.

Figure 13A:
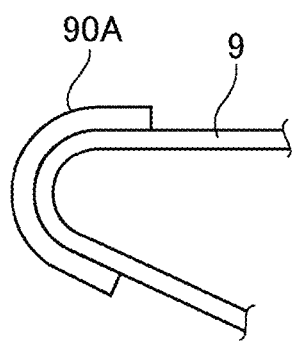
FIGS. 13A and 13B are explanatory diagrams of a curved-shape holding member according to a first modification.
Figure 13B:
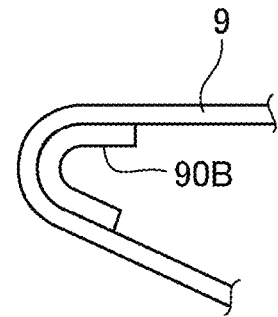

(2) FIGS. 13A and 13B are explanatory diagrams of curved-shape holding members 90A and 90B according to a first modification. The curved-shape holding members 90A and 90B illustrated in FIGS. 13A and 13B are metal plates bent into a curved shape. The curved-shape holding member 90A illustrated in FIG. 13A is attached to an outer peripheral side of a curved portion of the flexible printed board 9. The curved-shape holding member 90B illustrated in FIG. 13B is attached to an inner peripheral side of the curved portion of the flexible printed board 9. If such curved-shape holding members 90A and 90B are used, it is also possible to maintain the flexible printed board 9 in a curved shape. Therefore, the shape of the flexible printed board 9 is easily maintained.

If a metal plate is used as the curved-shape holding member, flat metal plates are attached to folding positions A1 to A4 and B1 to B2 of the developed flexible printed board 9 illustrated in FIG. 7, when the flexible printed board 9 is curved at the folding positions, the metal plate is simultaneously deformed into a curved shape to obtain the shape illustrated in FIGS. 13A and 13B. Thus, it is possible to easily attach the curved-shape holding members 90A and 90B.

Figure 14:
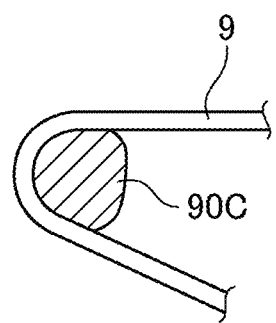
FIG. 14 is an explanatory diagram of a curved-shape holding member according to a second modification.

(3) FIG. 14 is an explanatory diagram of a curved-shape holding member 90C according to a second modification. The curved-shape holding member 90 illustrated in FIG. 14 is a cured product obtained by curing an adhesive. Thus, it is only necessary to apply the adhesive to the curved portion, and thus, it is possible to reduce the number of components.

Figure 15:
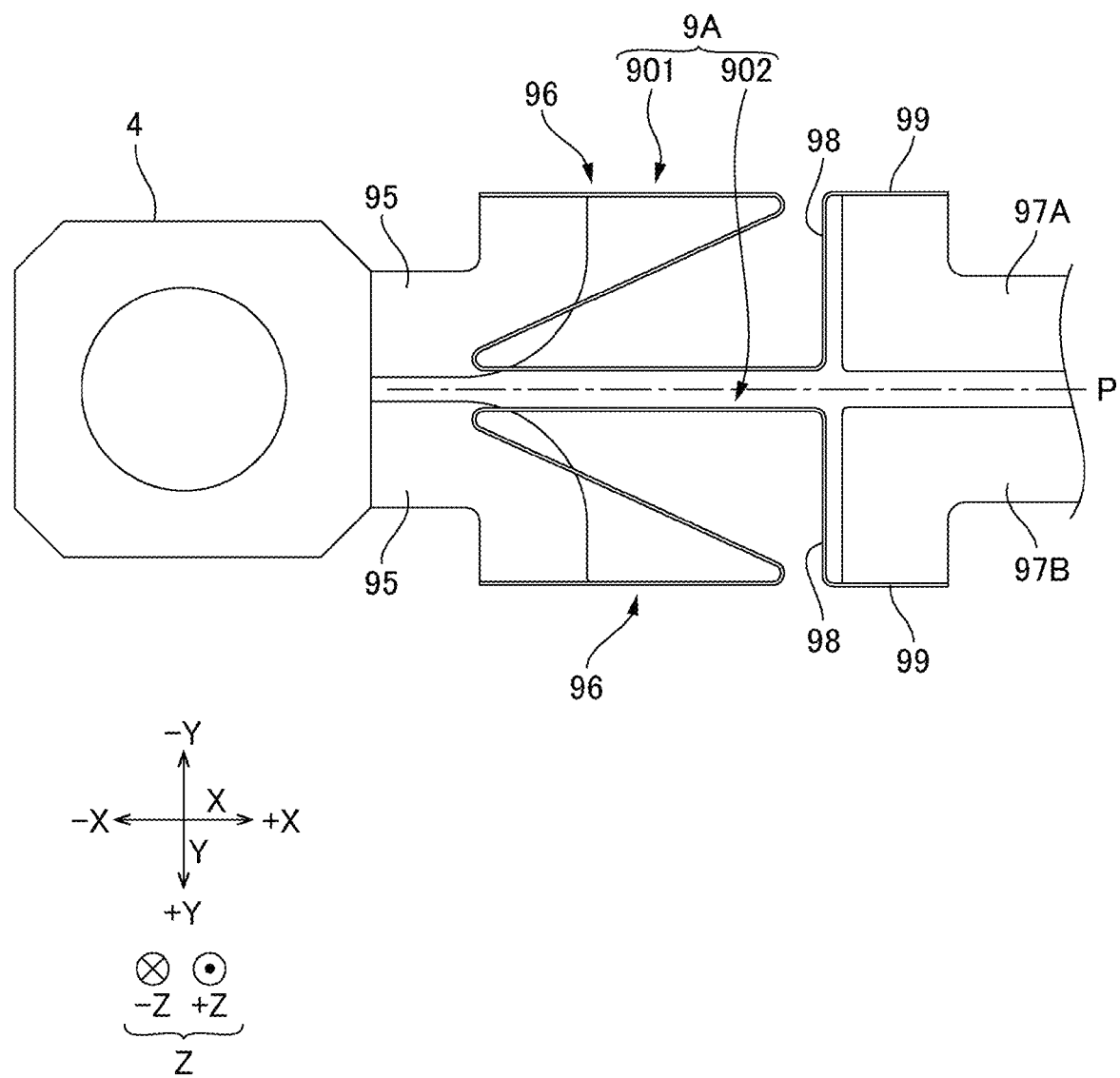
FIG. 15 is a plan view of the flexible printed board divided into two components.

(4) FIG. 15 is a plan view of a flexible printed board 9A divided into two parts. As illustrated in FIG. 15, a flexible printed board including a first flexible printed board 901 and a second flexible printed board 902 arranged in the Y-axis direction may be employed for the flexible printed board 9A. The first flexible printed board 901 and the second flexible printed board 902 may include a shape symmetrical with respect to the virtual plane P parallel to the XZ plane including the X axis and the Z axis between the first flexible printed board 901 and the second flexible printed board 902. The first flexible printed board 901 includes the first extending part 95, the meandering part 96, the third extending part 98, the fourth extending part 99, and a second extending part 97A. The second flexible printed board 902 includes the first extending part 95, the meandering part 96, the third extending part 98, the fourth extending part 99, and a second extending part 97B. The second extending part 97A and the second extending part 97B have a shape symmetrical with respect to the virtual plane.

In an embodiment of FIG. 15, it is possible to distribute a wiring pattern connected to the movable body 5 to each of the first flexible printed board 901 and the second flexible printed board 902. As a result, it is possible to suppress width dimensions of the first flexible printed board 901 and the second flexible printed board 902 to easily suppress the flexible printed board 9 from hindering the rotation of the movable body 5. The meandering part 96 is routed to meander after being curved in the Z-axis direction, and thus, the width dimensions of the first board portion 91 and the second board portion 92 are reduced in size to decrease a height of the meandering part 96 in the Z-axis direction. Therefore, it is advantageous for a reduction in size of the optical unit with a shake correction function 1 in the Z-axis direction.

What is claimed is:

1. An optical unit with a shake correction function, comprising:
    a movable body having a camera module, when three axes orthogonal to one another are an X axis, a Y axis, and a Z axis, the movable body configured to be rotatably supported around the X axis, the Y axis, and the Z axis;
    a flexible printed board, configured to be pulled out from the movable body; and
    a board support part, configured to support the flexible printed board at a position apart from the movable body in a direction of the X axis,
    wherein
    when a direction from the camera module toward the board support part is a first direction, in the direction of the X axis,
    the flexible printed board comprises:
        a first extending part, configured to be pulled out from the movable body in the first direction along an XY plane comprising the X axis and the Y axis;
        a meandering part, configured to be curved in a direction of the Z axis from an end of the first extending part in a direction of the Y axis, and extend in the direction of the Y axis while meander in the direction of the X axis; and
        a second extending part, configured to be arranged in the first direction of the meandering part, extend in the first direction along the XY plane, and be fixed to the board support part.

2. The optical unit with a shake correction function according to claim 1, wherein the flexible printed board comprises:
    a third extending part, configured to be curved in the direction of the Y axis from an end of the meandering part in the first direction, and extend in the direction of the Y axis; and
    a fourth extending part, configured to be curved in the first direction from an end of the third extending part in the direction of the Y axis, and extend in the first direction,
    wherein the second extending part is configured to be curved in the direction of the Y axis from an end of the fourth extending part in the direction of the Z axis, and extend along the XY plane.

3. The optical unit with a shake correction function according to claim 2, wherein
    the flexible printed board comprises: a flat surface portion, and a curved portion curved from an end of the flat surface portion,
    the flat surface portion is arranged in each of the first extending part, the meandering part, the third extending part, the fourth extending part, and the second extending part,
    wherein the curved portion comprises:
        a first curved portion, configured to be curved in the direction of the Z axis from an end of the first extending part in the direction of the Y axis to be connected to the meandering part;

second curved portions, configured to be provided at folded positions of the meandering part;

a third curved portion, configured to be curved in the direction of the Y axis from an end in the first direction of the meandering part to be connected to the third extending part;

a fourth curved portion, configured to be curved in the first direction from an end of the third extending part in the direction of the Y axis to be connected to the fourth extending part; and a fifth curved portion, configured to be curved in the direction of the Y axis from an end of the fourth extending part in the direction of the Z axis to be connected to the second extending part, wherein each of the first curved portion, the second curved portion, the third curved portion, the fourth curved portion, and the fifth curved portion is fixed with a curved-shape holding member.

4. The optical unit with a shake correction function according to claim 3, wherein the curved-shape holding member is a rod-shaped member having a cylindrical outer peripheral surface.

5. The optical unit with a shake correction function according to claim 3, wherein the curved-shape holding member is a metal plate bent into a curved shape.

6. The optical unit with a shake correction function according to claim 3, wherein the curved-shape holding member is a cured product obtained by curing an adhesive.

7. The optical unit with a shake correction function according to claim 2, wherein the flexible printed board comprises:

a first board portion and a second board portion, configured to be arranged in the direction of the Y axis; and a third board portion, configured to connect an end portion of the first board portion in the first direction and an end portion of the second board in the first direction, wherein the first board portion and the second board portion have a shape symmetrical with respect to a virtual plane parallel to an XZ plane comprising the X axis and the Z axis between the first board portion and the second board portion, each of the first board portion and the second board portion comprises: the first extending part, the meandering part, the third extending part, and the fourth extending part, the third board portion comprises the second extending part.

8. The optical unit with a shake correction function according to claim 7, wherein a planar shape obtained when the flexible printed board is developed comprises:

a pair of first linear board portions, configured to be extended in parallel in a straight line;

a pair of one-side protruding board portions, configured to be protruded outward in a facing direction in which the pair of first linear board portions face each other, from one end portions of each of the first linear board portions in an extending direction;

a pair of second linear board portions, configured to be extended in the extending direction from an outer end portion in the facing direction of each of the one-side protruding board portions;

a pair of alternate-side protruding board portions, configured to be protruded inward in the facing direction from one end portion in the extending direction of each of the second linear board portions; and a connection board portion, configured to connect the pair of alternate-side protruding board portions on the other side in the extending direction of the pair of the second linear board portions.

9. The optical unit with a shake correction function according to claim 1, wherein as the flexible printed board, a first flexible printed board and a second flexible printed board arranged in the direction of the Y axis, are provided, wherein the first flexible printed board and the second flexible printed board have a shape symmetrical relative to a virtual plane parallel to an XZ plane comprising the X axis and the Z axis between the first flexible printed board and the second flexible printed board.

10. The optical unit with a shake correction function according to claim 1, wherein the Z axis coincides with an optical axis of the camera module.

11. The optical unit with a shake correction function according to claim 1, further comprising:

a shake correction magnetic drive mechanism, configured to rotate the movable body around the X axis and the Y axis; and a rolling correction magnetic drive mechanism, configured to rotate the movable body around the Z axis.

* * * * *